(12) United States Patent
Cho et al.

(10) Patent No.: US 8,400,604 B2
(45) Date of Patent: Mar. 19, 2013

(54) ARRAY SUBSTRATE FOR IPS-MODE LCD DEVICE BEING CAPABLE OF PREVENTING WAVY NOISE

(76) Inventors: Ki-Sul Cho, Gumi-si (KR); Young-Seok Choi, Daejeon (KR); Byung-Yong Ahn, Dae-gu (KR); Tae-Ung Hwang, Gyeongsangbuk-do (KR); Dong-Jun Min, Seoul (KR); Bo-Kyoung Jung, Jeonju-si (KR)

( * ) Notice: Subject to any disclaimer, the term of this patent is extended or adjusted under 35 U.S.C. 154(b) by 0 days.

(21) Appl. No.: 12/850,357

(22) Filed: Aug. 4, 2010

(65) Prior Publication Data

US 2010/0315584 A1    Dec. 16, 2010

Related U.S. Application Data

(62) Division of application No. 11/639,314, filed on Dec. 15, 2006, now Pat. No. 7,796,225.

(30) Foreign Application Priority Data

Dec. 29, 2005  (KR) .................. 10-2005-0133525

(51) Int. Cl.
*G02F 1/1343*    (2006.01)
(52) U.S. Cl. ........................................ 349/141; 349/149
(58) Field of Classification Search .................. 349/141, 349/149
See application file for complete search history.

(56) References Cited

U.S. PATENT DOCUMENTS

| | | | |
|---|---|---|---|
| 6,417,906 B2* | 7/2002 | Ohta et al. ................... 349/141 |
| 6,486,933 B1* | 11/2002 | Cha et al. .................... 349/139 |
| 2001/0005252 A1* | 6/2001 | Lee et al. ..................... 349/141 |
| 2003/0197181 A1* | 10/2003 | Yun ................................ 257/72 |
| 2004/0046903 A1* | 3/2004 | Matsumoto et al. ............ 349/43 |
| 2004/0046919 A1 | 3/2004 | Kim |
| 2004/0070718 A1* | 4/2004 | Saigo et al. .................. 349/141 |

* cited by examiner

*Primary Examiner* — Lauren Nguyen
(74) *Attorney, Agent, or Firm* — McKenna Long & Aldridge, LLP

(57) ABSTRACT

Provided is an array substrate for an IPS-mode LCD device and method of fabricating the same that prevents a problem referred to as wavy noise. The IPS-mode LCD device and method have a shorter processing time and low error rate without an increase in fabrication and production costs.

16 Claims, 29 Drawing Sheets

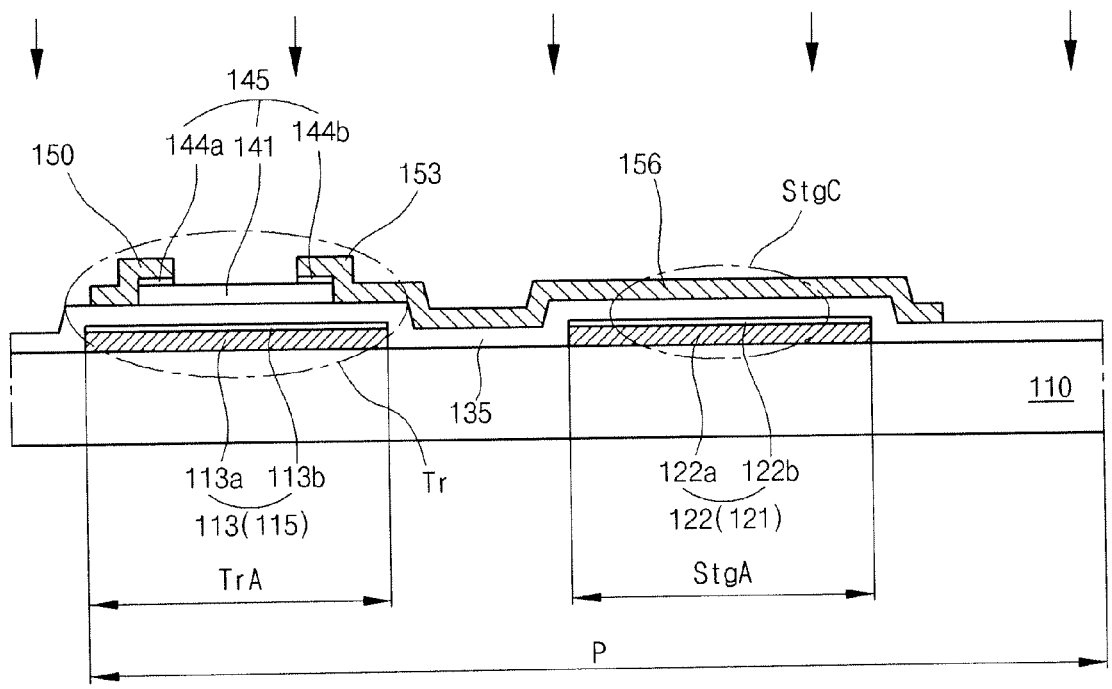
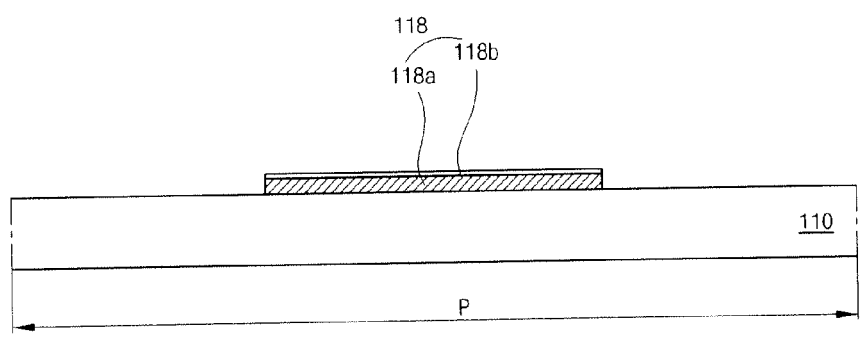

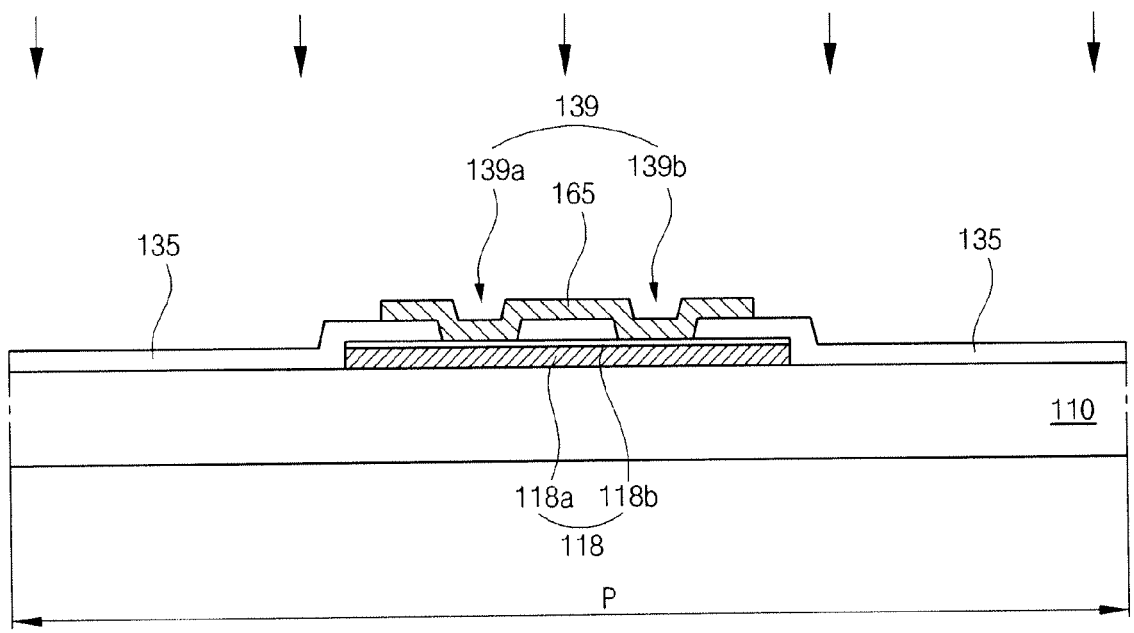

dry etching dry etching

ARRAY SUBSTRATE FOR IPS-MODE LCD DEVICE BEING CAPABLE OF PREVENTING WAVY NOISE

CROSS-REFERENCE TO RELATED APPLICATIONS

This application is a Divisional of application Ser. No. 11/639,314 filed Dec. 15, 2006, now U.S. Pat. No. 7,796,225, which claims priority to Korean Patent Application No. 10-2005-0133525, filed Dec. 29, 2005, all of which are hereby incorporated by reference for all purposes as if fully set forth herein.

BACKGROUND OF THE INVENTION

1. Field of the Invention

The present invention relates to a liquid crystal display (LCD) device. More particularly, the present invention relates to an array substrate for an in-plane switching mode (IPS-mode) LCD device that prevents wavy noise and a method of fabricating the same.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Recently, since the LCD device including a thin film transistor (TFT) as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and the TFT, and the color filter substrate may include a color filter layer and a common electrode. The AM-LCD device is driven by an electric field between the pixel electrode and the common electrode. However, since the AM-LCD device uses a vertical electric field, the AM-LCD device has a bad viewing angle.

An IPS-mode LCD device may be used to resolve the above-mentioned problem. FIG. 1 is a cross-sectional view of a related art IPS-mode LCD device. As shown in FIG. 1, the array substrate and the color filter substrate are separated and face each other. The array substrate includes a first substrate 10, a common electrode 17 and a pixel electrode 30. Though not shown, the array substrate may include a TFT, a gate line and a data line. The color filter substrate includes a second substrate 9, a color filter layer (not shown), and so on. A liquid crystal layer 11 is interposed between the first substrate 10 and the second substrate 9. Since the common electrode 17 and the pixel electrode 30 are formed on the first substrate 10 on a same level, a horizontal electric field "L" between the common and pixel electrodes 17 and 30 is formed.

FIGS. 2A and 2B are cross-sectional views showing turned on/off conditions of the related art IPS-mode LCD device. As shown in FIG. 2A, when the voltage is applied to the IPS-mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by a horizontal electric field, the IPS-mode LCD device has a characteristic of a wide viewing angle. FIG. 2B shows a condition when the voltage is not applied to the IPS-mode LCD device. Because a electric field is not formed between the common and pixel electrodes 17 and 30, the arrangement of liquid crystal molecules 11 is not changed.

FIG. 3 is a plan view of an array substrate of the IPS-mode LCD device according to the related art. As shown in FIG. 3, the array substrate includes a substrate (not shown), a gate line 43, a data line 60, and a common line 47. The gate line 43 is formed along a first direction of the substrate on the substrate. The data line 60 crosses the gate line 43 such that the gate and data lines 43 and 60 define a pixel region "P" on the substrate. The common line 47 is parallel to the gate line 43. The common line 47 also crosses the data line 60.

A TFT "Tr", a switching element, is formed at a crossing portion of the gate and data lines 43 and 60. The TFT "Tr" includes a gate electrode 45, a semiconductor layer 51, and source and drain electrodes 53 and 55. The gate electrode 45 extends from the gate line 43 into the pixel region "P". The source electrode 53 extends from the data line 60, and the source and drain electrodes 53 and 55 are separated from each other on the semiconductor layer 51. Moreover, a plurality of pixel electrodes 70 and a plurality of common electrodes 49 are formed on the substrate in the pixel region "P". The plurality of pixel electrodes 70 extend from a pixel connection line 68, which contacts the drain electrode 55 through a drain contact hole 66. The plurality of common electrodes 49 extend from the common line 47 and are alternately arranged with the plurality of pixel electrodes 70. Ends of each pixel electrode are connected to each other such that the connected portion is defined as a second storage electrode 69. The second storage electrode 69 overlaps the common line 47, and a portion of the common line 47 overlapped with the second storage electrode 69 is defined as a first storage electrode 48. The first electrode 69 and second storage electrode 48 compose a storage capacitor StgC.

FIG. 4 is cross-sectional view of a portion taken along the line IV-IV of FIG. 3. As shown in FIG. 4, the array substrate for the IPS-mode LCD device according to the related art includes the substrate 40, the gate electrode 45, the semiconductor layer 51, the source and drain electrodes 53 and 55, the plurality of pixel electrodes 70, and the plurality of common electrodes 49. The array substrate is fabricated through the following steps. The gate line 43 (of FIG. 3), the gate electrode 45, the common line 47 (of FIG. 3) and the plurality of common electrodes 49 are formed on the substrate 40 by depositing and patterning a first metal material through a first mask process. Next, a gate insulating layer 50 is formed on the substrate 40 including the gate line 43 (of FIG. 3), the gate electrode 45, the common line 47 (of FIG. 3) and the plurality of common electrodes 49. Then, the semiconductor layer 51, which includes an intrinsic amorphous silicon layer 51a and an impurity-doped amorphous silicon layer 51b, is formed on the gate insulating layer 50 by depositing and patterning intrinsic amorphous silicon and impurity-doped amorphous silicon through a second mask process.

And the data line 60 (of FIG. 3), the source electrode 53 and the drain electrode 55 are formed on the semiconductor layer 51 and the gate insulating layer 50 by depositing and patterning a second metal material through a third mask process. As mentioned above, the source electrode 53 extends from the data line 60, and the source and drain electrodes 53 and 55 are separated from each other.

Next, a passivation layer 63 including a drain contact hole 66 is formed on the source and drain electrodes 53 and 55 and the gate insulating layer 50 by depositing and patterning an insulating material through a fourth mask process. As mentioned above, the drain contact hole 66 exposes the drain electrode 55.

Finally, the pixel connection line 68 and the plurality of pixel electrodes 70 are formed on the passivation layer 63 by depositing and patterning a transparent conductive material through a fifth mask process. The pixel connection line 68 contacts the drain electrode 55 through the drain contact hole 66 such that the plurality of pixel electrodes 70 are electrically connected to the drain electrode 55. The plurality of pixel electrodes 70 are alternately arranged with the plurality of common electrodes 49.

As discussed above, the array substrate for the IPS-mode LCD device according to the related art is fabricated through five mask processes. Accordingly, a processing time, an error rate and production costs are increased, and a production yield is decreased.

To resolve these problems, a fabricating process using four mask processes is suggested. However, since the source and drain electrodes do not cover both ends of the semiconductor layer, a problem, referred to as wavy noise, is caused. The wavy noise means that when the IPS-mode LCD device is turned on or off, a wave pattern appears on a liquid crystal panel.

SUMMARY OF THE INVENTION

Accordingly, the present invention is directed to an array substrate for an IPS-mode LCD device and a method of fabricating the same that substantially obviate one or more of the problems due to limitations and disadvantages of the related art.

An advantage of the present invention is to provide an array substrate for an IPS-mode LCD device and a method of fabricating the same that have a short processing time and low error rate without an increase in a fabrication process and a production cost.

Another advantage of the present invention is to provide an array substrate for an IPS-mode LCD device and a method of fabricating the same that prevents a problem referred to as wavy noise.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an IPS-mode LCD device comprises a substrate having a switching region and a pixel region; a gate line on the substrate; a gate electrode formed in the switching region and extending from the gate line; a common line substantially parallel to the gate line and separated from the gate line; first and second common electrodes extending from the common line into the pixel region and separated from each other; a gate insulating layer on the gate line, the common line and the first and second common electrodes, wherein the gate insulating layer has a common line contact hole exposing the common line; a data line crossing the gate line to define the pixel region on the gate insulating layer; a semiconductor layer corresponding to the gate electrode on the gate insulating layer; a source electrode and a drain electrode separated from each other on the semiconductor layer, wherein the source electrode extends from the data line; a plurality of pixel electrodes between the first and second common electrodes, wherein the plurality of pixel electrodes are separated from each other and substantially parallel to the first and second common electrodes, and each of the plurality of pixel electrodes extends from the drain electrode; and a plurality of third common electrodes formed on the gate insulating layer, wherein the plurality of third common electrodes are connected to the common line through the common line contact hole and alternately arranged with the plurality of pixel electrodes, wherein the data line, the plurality of pixel electrodes and the plurality of third common electrodes are formed on a same layer and with a same material as one another.

In another aspect of the present invention, a method of fabricating an array substrate for an IPS-mode LCD device comprises forming a gate line, a gate electrode, a first common line, and first and second common electrodes on a substrate having a switching region and a pixel region using a first mask process, wherein the gate electrode extends from the gate line and is formed in the switching region, the first common line is substantially parallel to the gate line, and the first and second common electrodes extend from the first common line into the pixel region; sequentially forming a gate insulating layer, an intrinsic amorphous silicon layer and an impurity-doped amorphous silicon layer on the gate line, the gate electrode, and the first and second common electrodes; forming a common line contact hole in the gate insulating layer, an active layer and an impurity-doped amorphous silicon pattern by patterning the gate insulating layer, the intrinsic amorphous silicon layer and the impurity-doped amorphous silicon layer using a second mask process, wherein the common line contact hole exposes the first common line, the active layer corresponds to the gate electrode on the gate insulating layer and the impurity-doped amorphous silicon pattern has a same shape as the active layer on the active layer; and forming a data line, a source electrode, a drain electrode, a plurality of pixel electrodes and a plurality of third common electrodes on the gate insulating layer, the active layer and the impurity-doped amorphous silicon pattern using a third mask process, wherein the data line crosses the gate line to define the pixel region, the source electrode extends from the data line and contacts the impurity-doped amorphous silicon pattern, and the drain electrode is separated from the source electrode and contacts the impurity-doped amorphous silicon pattern, wherein the plurality of pixel electrodes are separated each other and substantially parallel to the first and second common electrodes, and each of the plurality of electrodes extends from the drain electrode, and wherein the plurality of third common electrodes contact the first common line through the common line contact hole and are alternately arranged with the plurality of pixel electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11A to 11H are cross-sectional views showing processes of fabricating a portion taken along the line VII-VII of FIG. 5.

FIGS. 12A to 12H are cross-sectional views showing processes of fabricating a portion taken along the line VIII-VIII of FIG. 5.

DETAILED DESCRIPTION OF THE
ILLUSTRATED EMBODIMENTS

Reference will now be made in detail to embodiments of the present invention, examples of which are illustrated in the accompanying drawings.

Figure 1:
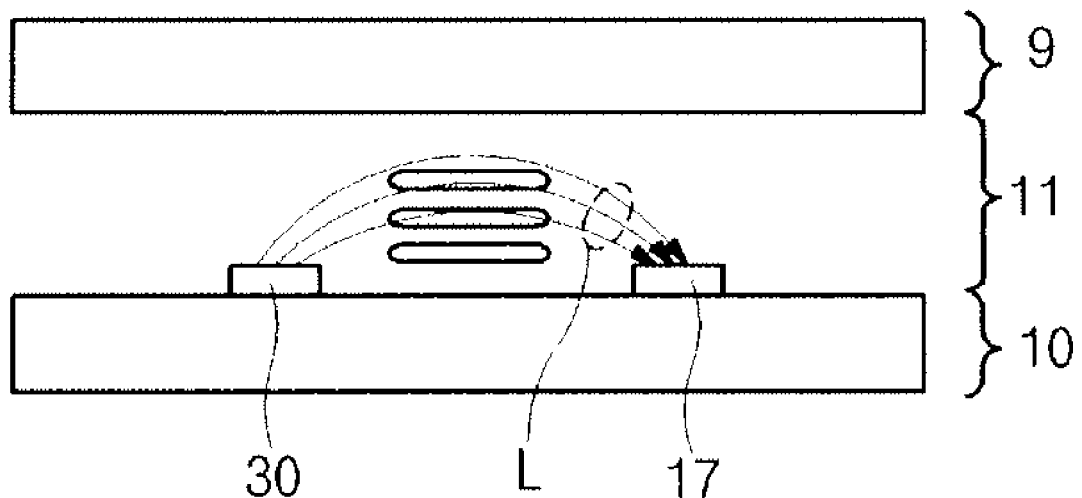
FIG. 1 is a schematic cross-sectional view of a related art IPS-mode LCD device.
Figure 2A:
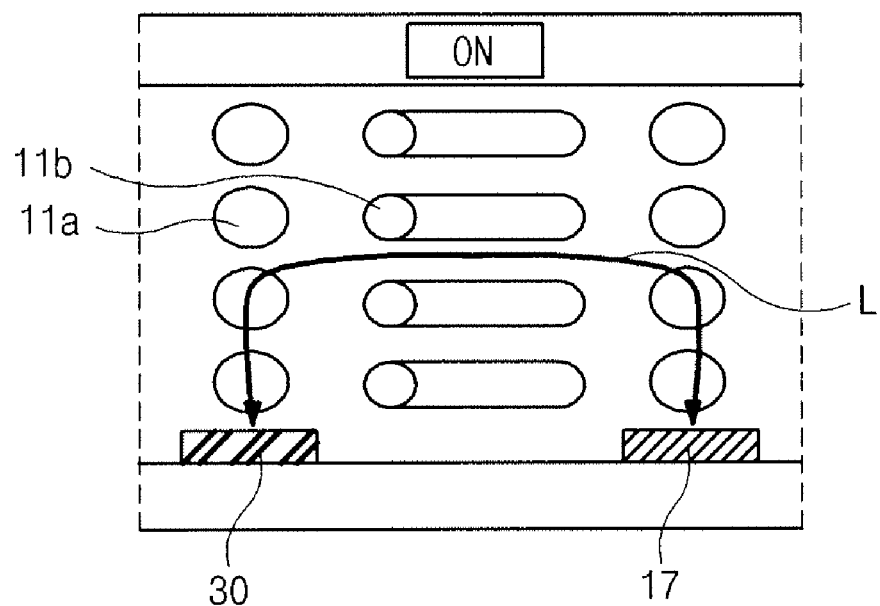
FIGS. 2A and 2B are cross-sectional views showing conditions of the related art IPS-mode LCD device when turned-on and turned-off.
Figure 2B:
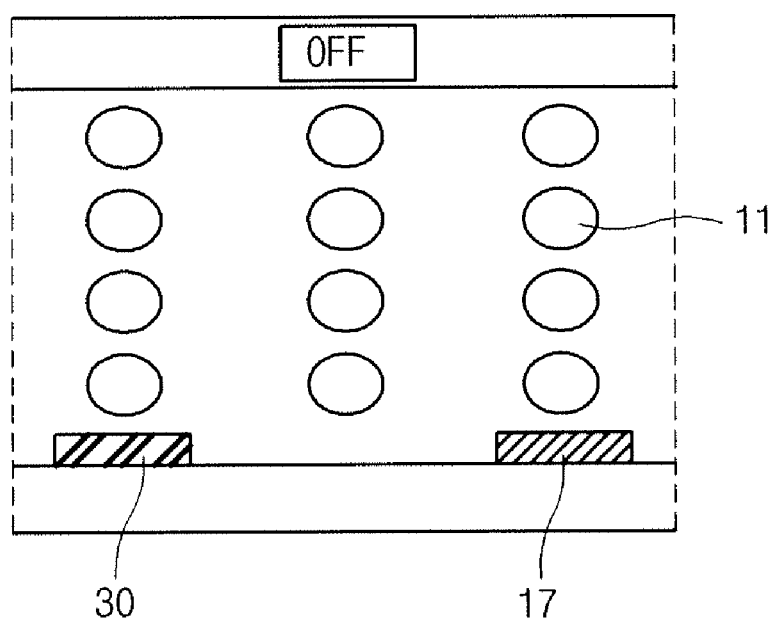
Figure 3:
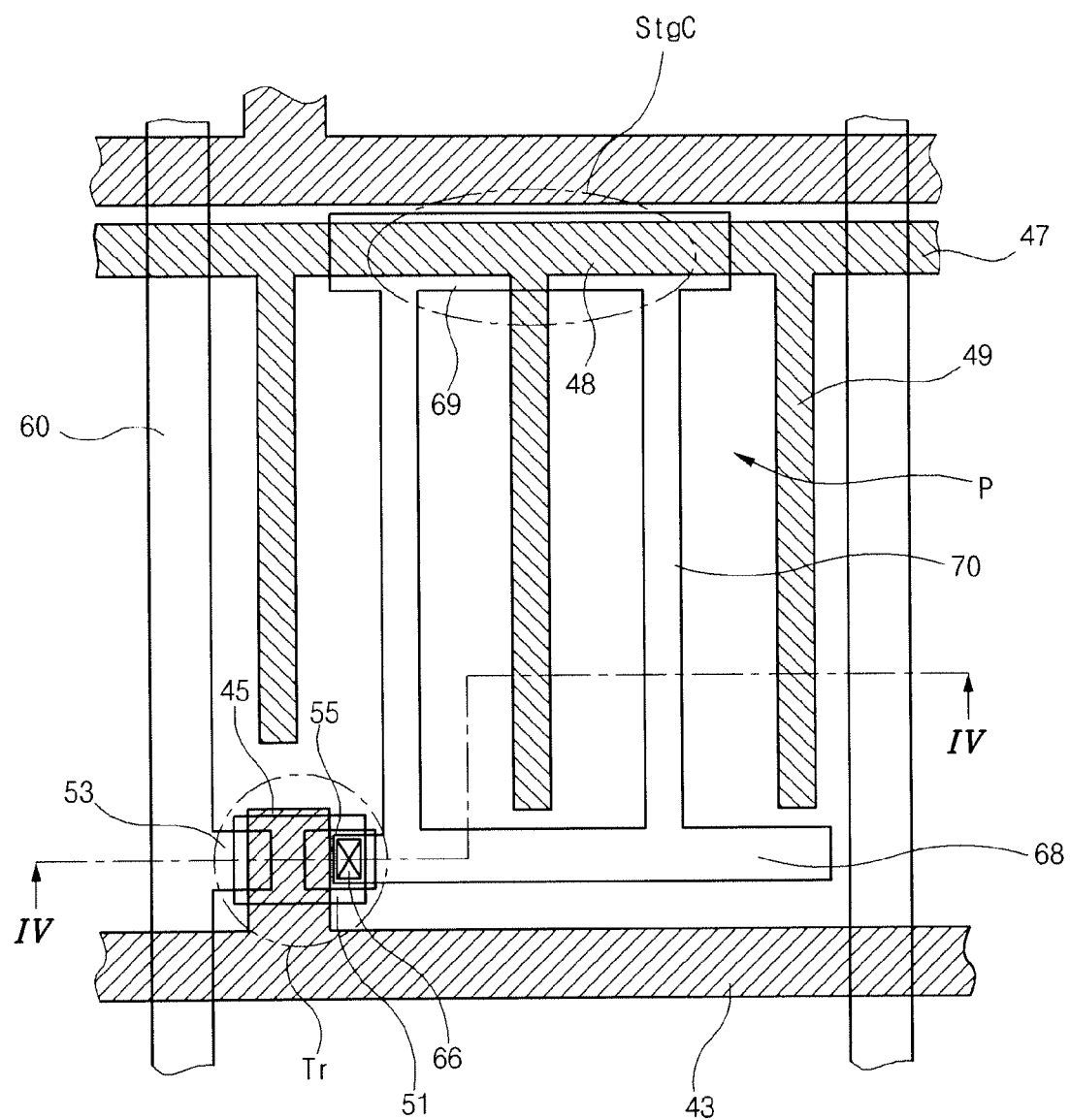
FIG. 3 is a plan view of an array substrate for an IPS-mode LCD device according to the related art.
Figure 4:
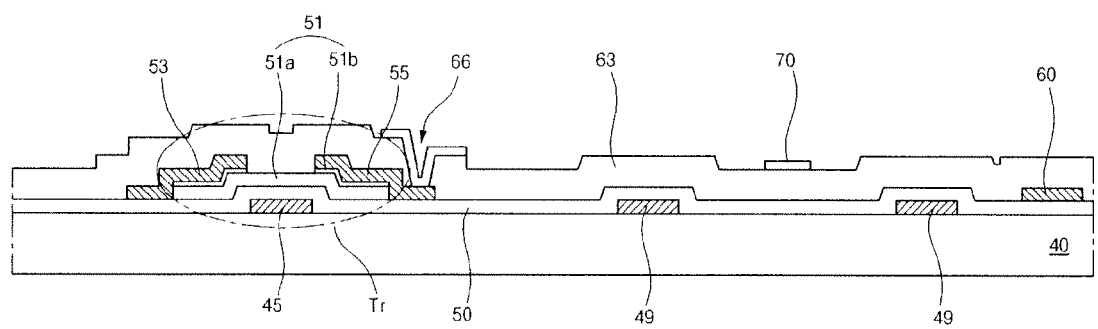
FIG. 4 is a cross-sectional view of a portion taken along the line IV-IV of FIG. 3.
Figure 5:
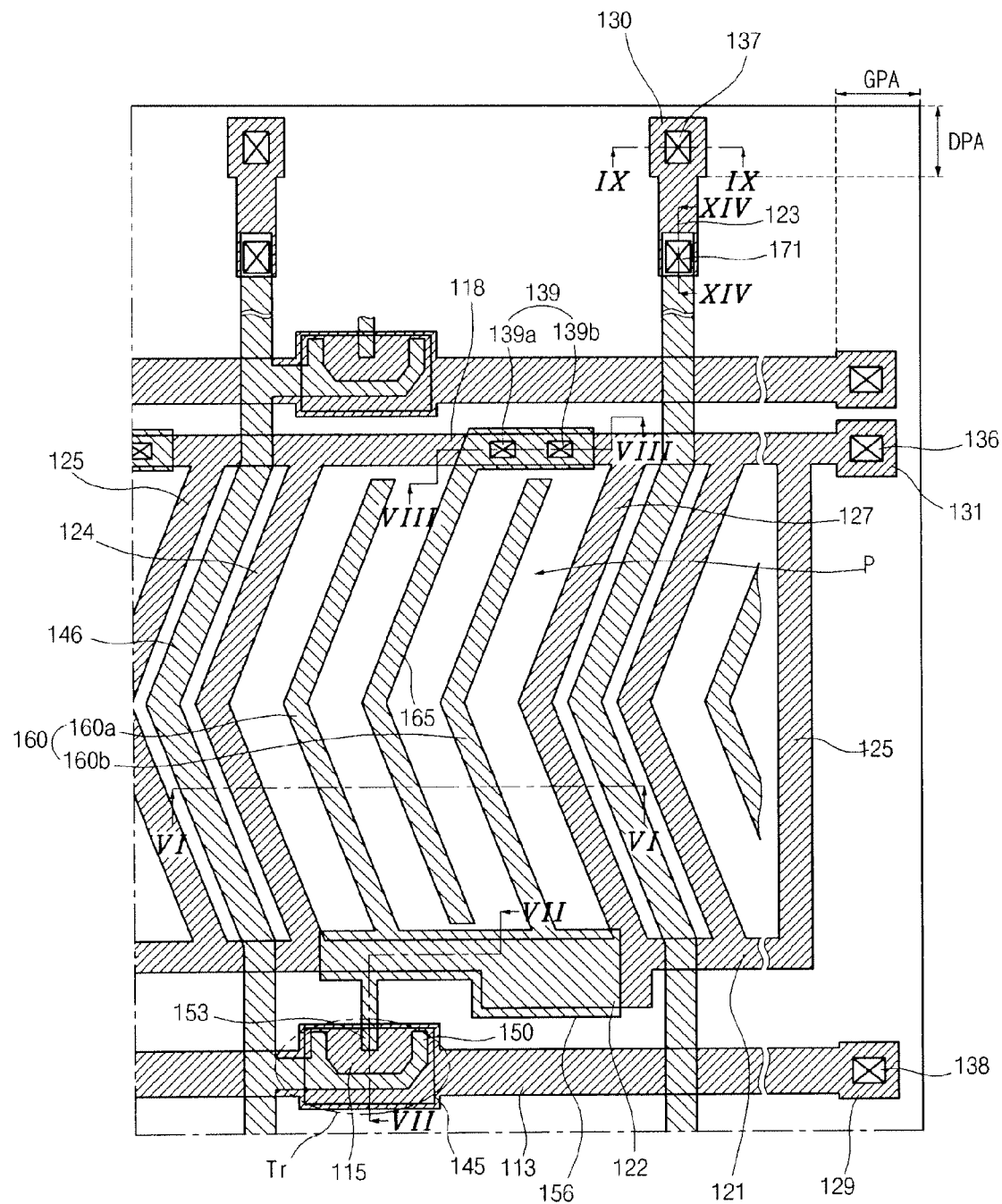
FIG. 5 is a plan view showing a pixel region of an array substrate for an IPS-mode LCD device according to the present invention.

FIG. 5 is a plan view showing a pixel region of an array substrate for an IPS-mode LCD device according to the present invention. As shown in FIG. 5, the array substrate includes a substrate (not shown), a gate line 113, a data line 146, a pixel electrode 160, first and second common lines 118 and 121, first, second and third common electrodes 124, 127 and 165 and a TFT "Tr". The gate line 113 is formed along a first direction of the substrate on the substrate. The data line 146 crosses the gate line 113 such that a pixel region "P" is defined on the substrate. The data line 146 has a substantially zigzag shape in an exemplary embodiment, but the data line 146 may have a substantially linear shape and so on. A gate pad electrode 129, which connects the gate line 113 and an external gate driving circuit (not shown), is formed at an end of the gate line 113 in a gate pad region "GPA", and a data pad electrode 130, which connects the data line 146 and an external data driving circuit (not shown), is formed at an end of the data line 146 in a data pad region "DPA". The data line 146 is connected to the data pad electrode 130 through a data link line 123 and a data link line contact hole 171. It is characteristic that the gate pad electrode 129 and the data pad electrode 130 are formed on a same layer as each other with a same material as each other.

The first and second common lines 118 and 121 are formed on the substrate. The first and second common lines 118 and 121 are separated from each other and substantially parallel to each other. The first and second common lines 118 and 121 with the first and second common electrodes 124 and 127 surround an edge of the pixel region "P". One end of the first and second common electrodes 124 and 127 are connected to the first common line 118, and the other end of the first and second common electrodes 124 and 127 are connected to the second common line 121. In other words, the first and second common lines 118 and 121 are disposed in upper and lower sides of the pixel region "P", and the first and second common electrodes 124 and 127 are disposed in right and left sides of the pixel region "P" substantially parallel to the data line 146. In addition, since a common connection line 125 connects the first and second common lines 118 and 121, two to five common line pad electrodes 131, which is less than a number of the first and second common lines 118 and 121 are formed between the gate pad electrodes 129 or of only two portions adjacent to the first and second gate pad electrodes 129 to apply a common voltage to the first and second common line 118 and 121 formed on an entire substrate.

The TFT "Tr" is formed at a switching region (not shown), that is a crossing portion of the gate and data lines 113 and 146. The TFT "Tr" includes the gate electrode 115, the semiconductor layer 145 the source electrode 150 and the drain electrode 153. In an exemplary embodiment according to the present invention, the source electrode 150 has a "U" shape, and the drain electrode 153 is inserted into the mouth of the "U" shape of the source electrode 150 with the drain electrode 153 separated from the drain electrode 150. However, in other embodiments of the present invention, the source and drain electrodes 150 and 153 may have other shapes.

The pixel electrode 160 including a first pixel electrode 160a and a second pixel electrode 160b is electrically connected to the drain electrode 153. The pixel electrode 160 extends from the drain electrode 153 into the pixel region "P" and is substantially parallel to the first and second common electrodes 124 and 127. The third common electrode 165 is formed between the first and second pixel electrodes 160a and 160b and is connected to the first common line 118 through a common line contact hole 139. The common line contact hole 139 may have first and second common line contact holes 139a and 139b. The third common electrode 165 is formed on a same layer as the first and second pixel electrodes 160a and 160b with a same material as the first and second pixel electrodes 160a and 160b. A common pad contact hole 136 is formed at one end of the first common line 118. In an exemplary embodiment of the present invention, the pixel electrode 160 has two pixel electrodes, that is the first and second pixel electrodes 160a and 160b. However, in another embodiment, the pixel electrode 160 may have multiple pixel electrodes, and then the third common electrode 165 also has several third common electrodes. When the third common electrode 165 includes the several third common electrodes, the several third common electrodes are alternately arranged with the multiple pixel electrodes. A horizontal electric field is generated between the first common electrode 124 and the first pixel electrode 160a, between the pixel electrode 160 and the third common electrode 165, and between the second pixel electrode 160b and the second common electrode 127.

A portion connecting the pixel electrode 160 and the drain electrode 153 overlaps the second common line 121. The second common line 121 overlapped with the portion is defined as a first storage electrode 122, and the portion is defined as a second storage electrode 156. The first storage electrode 122, the second storage electrode 156 and a gate insulating layer (not shown) interposed between the first and second storage electrodes 122 and 156 compose a storage capacitor (not shown).

Figure 6:
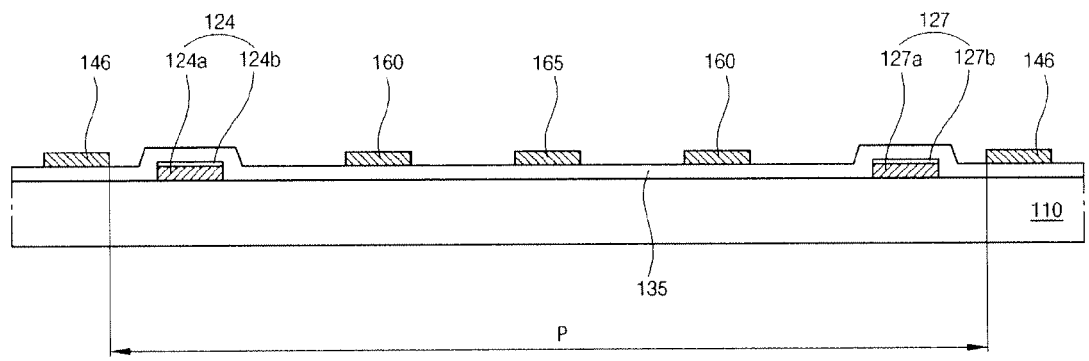
FIG. 6 is a cross-sectional view taken along the line VI-VI of FIG. 5.
Figure 7:
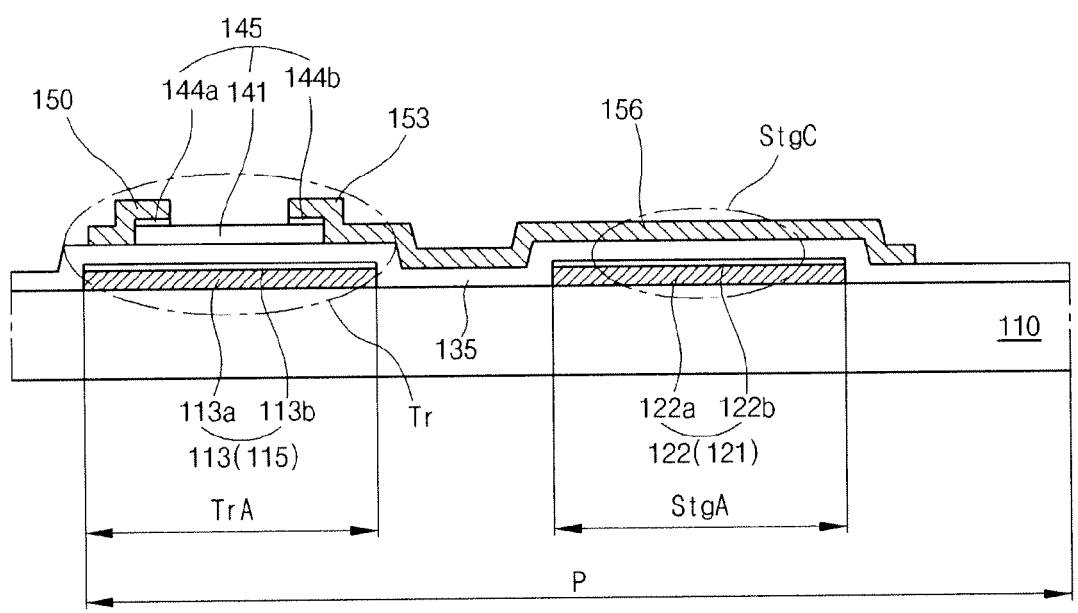
FIG. 7 is a cross-sectional view taken along the line VII-VII of FIG. 5.
Figure 8:
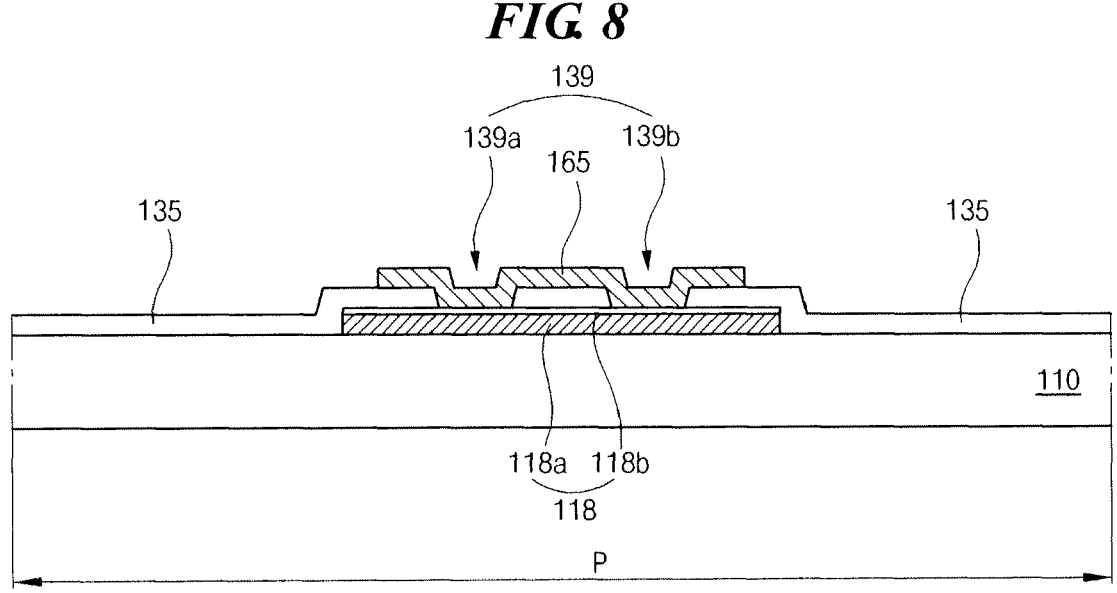
FIG. 8 is a cross-sectional view taken along the line VIII-VIII of FIG. 5.
Figure 9:
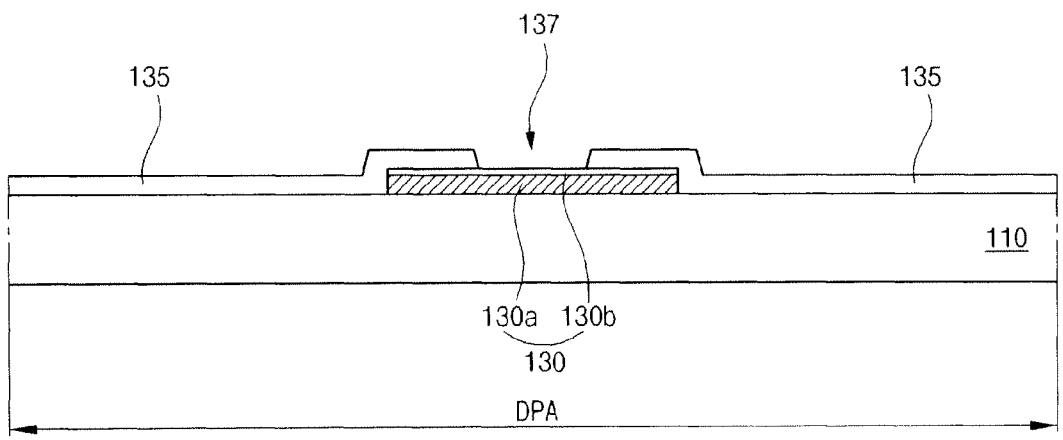
FIG. 9 is a cross-sectional view taken along the line IX-IX of FIG. 5.
Figure 10A:
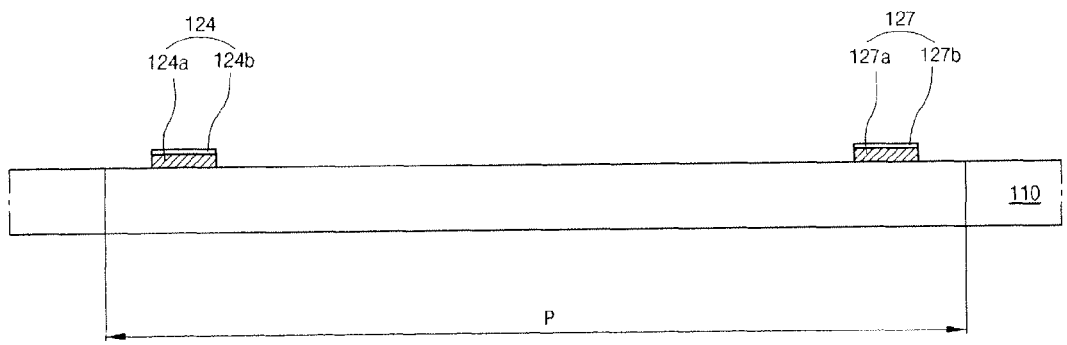
FIGS. 10A to 10H are cross-sectional views showing processes of fabricating a portion taken along the line VI-VI of FIG. 5.
Figure 10B:
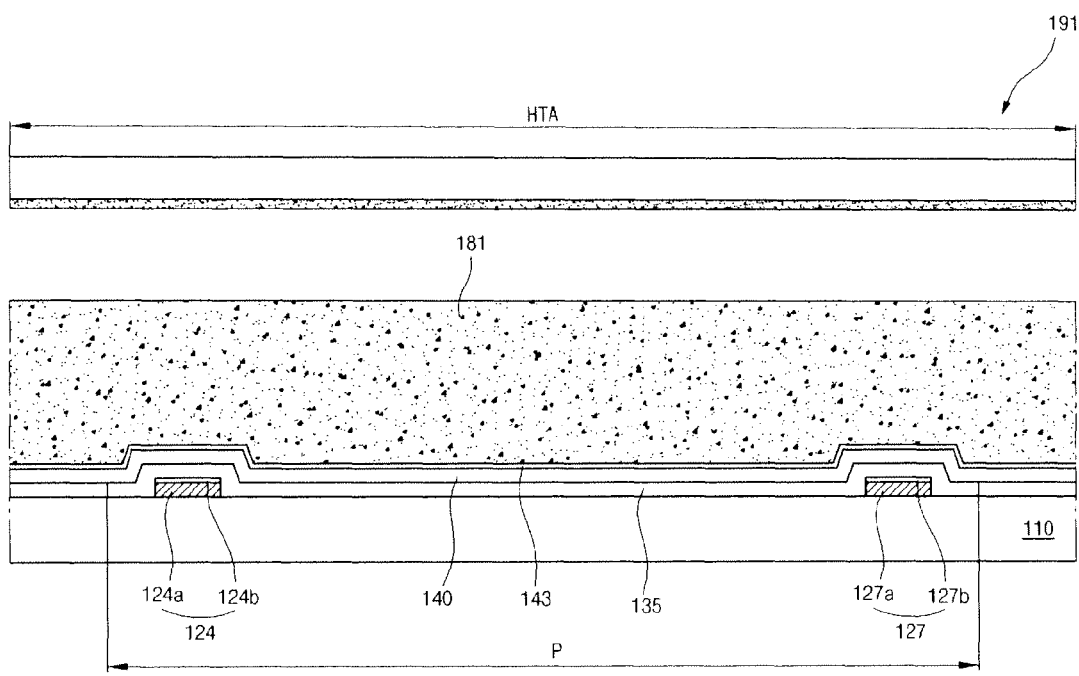
Figure 10C:
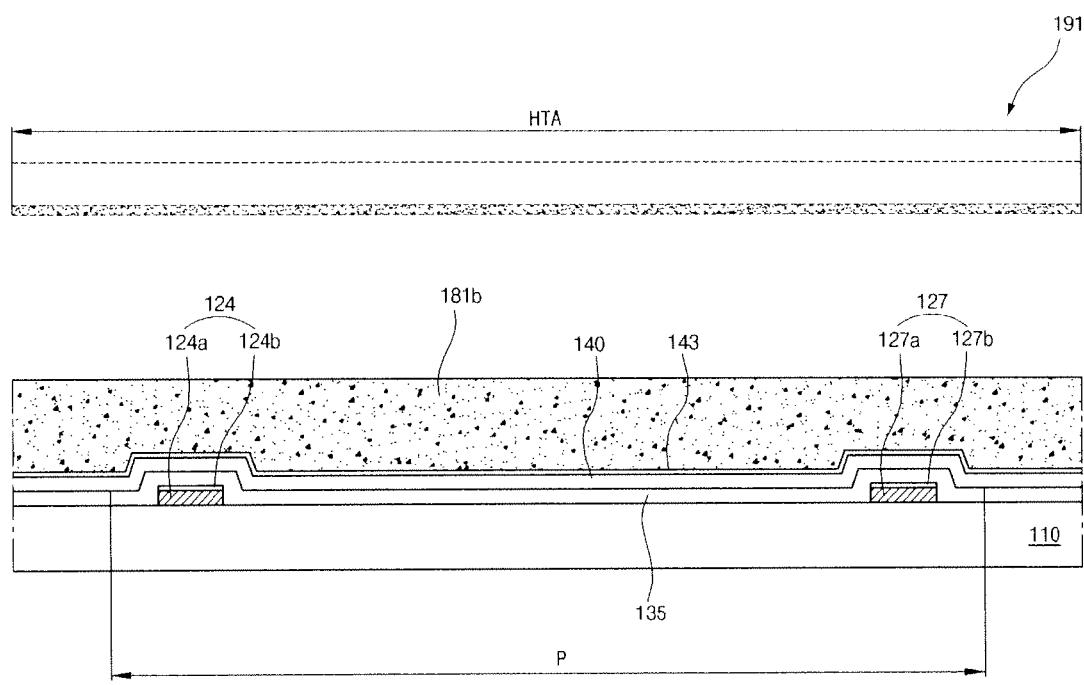
Figure 10D:
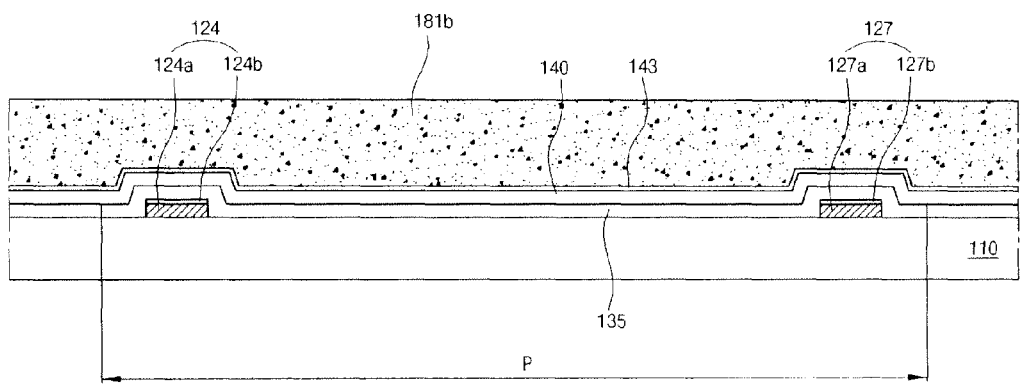
Figure 10E:
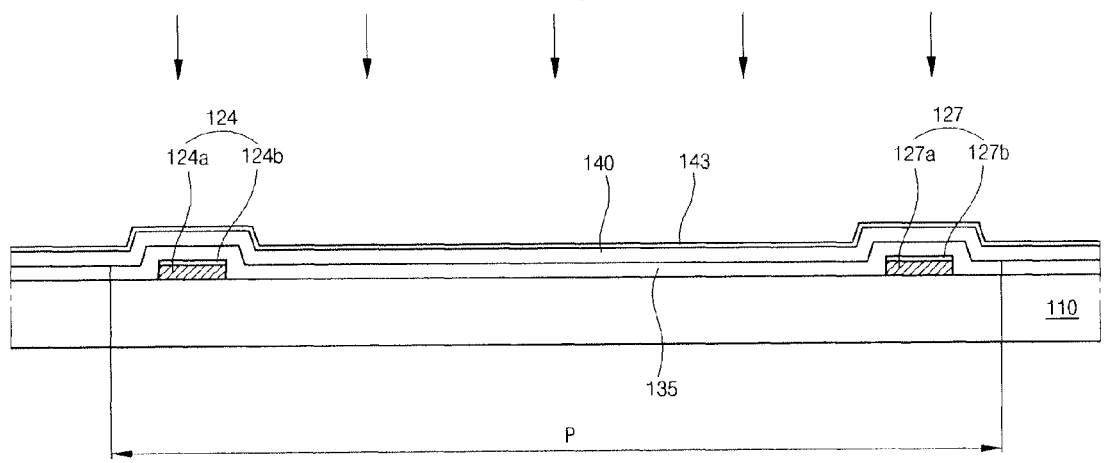
Figure 10F:
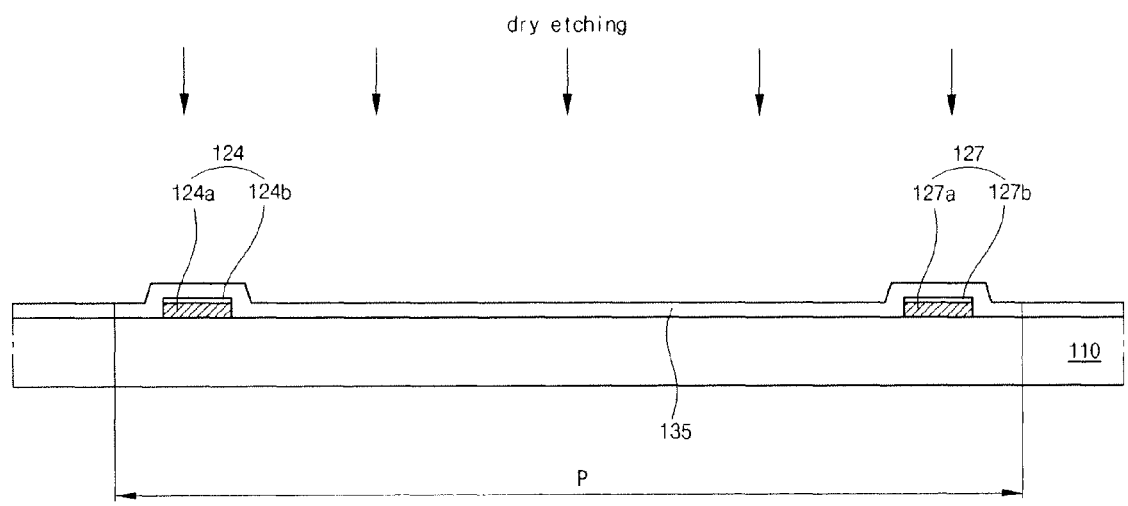
Figure 10G:
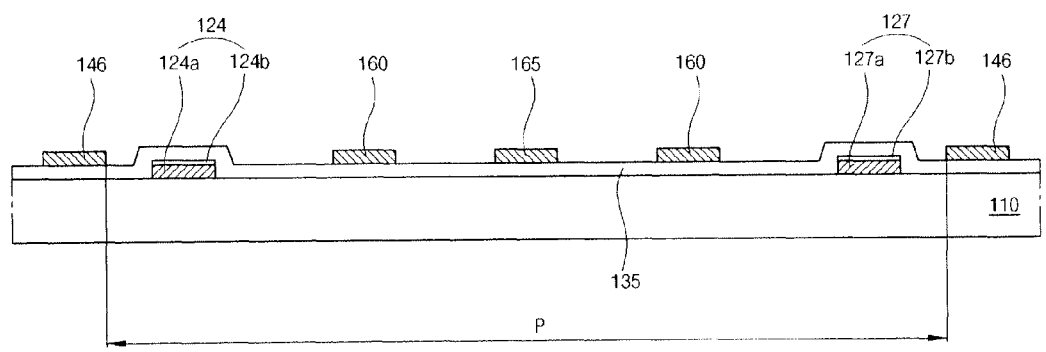
Figure 10H:
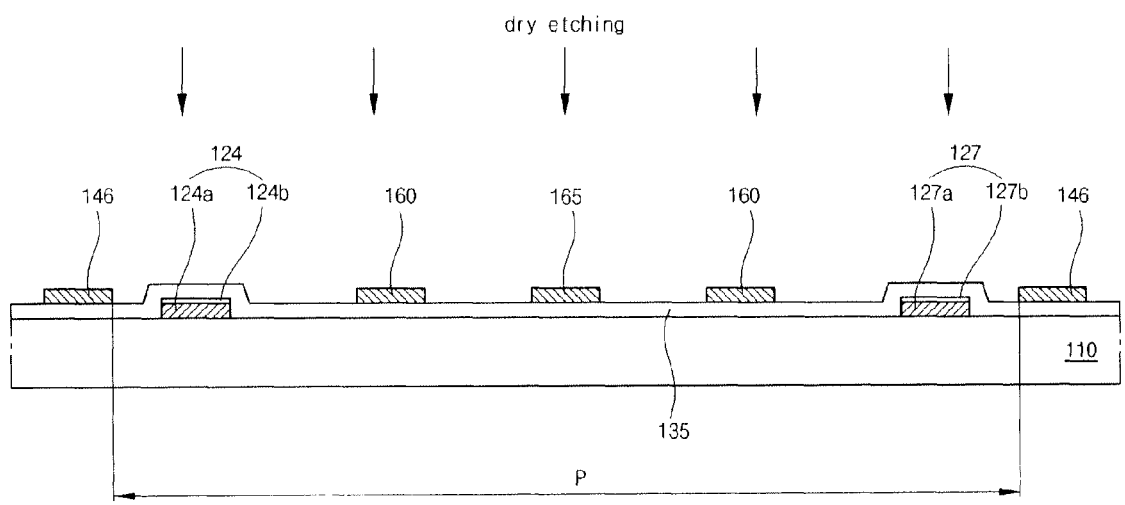

FIG. 6 is a cross-sectional view taken along the line VI-VI of FIG. 5, FIG. 7 is a cross-sectional view taken along the line VII-VII of FIG. 5, FIG. 8 is a cross-sectional view taken along the line VIII-VIII of FIG. 5, and FIG. 9 is a cross-sectional view taken along the line IX-IX of FIG. 5. The switching region "TrA", in which the TFT "Tr" is formed, a storage region "StgA", in which the storage capacitor "StgC" are defined in the pixel region. And the gate pad region "GPA" (of FIG. 5) and the data pad region "DPA" are defined at a periphery of the pixel region "P".

As shown in FIGS. 6 to 9, the gate line 113 is formed on the substrate 110. The gate line 113 in the switching region "TrA" functions as the gate electrode 115 in an exemplary embodiment of the present invention, but the gate electrode 115 may be formed to extend from the gate line 113 into the pixel region "P". The first and second common lines 118 and 121, which are substantially parallel to each other, are formed on the substrate 110 and are substantially parallel to the gate line 113. The gate pad electrode 129 (of FIG. 5) is formed at the end of the gate line 113 in the gate pad region "GPA" (of FIG. 5). The data pad electrode 130 is formed in the data pad region "DPA" and has a same shape as the gate pad electrode 129 (of FIG. 5). And a data link line 123 (of FIG. 5) contacts the data pad electrode 130 through a data pad contact hole 137 and extends to an end of the data line 146.

In the pixel region "P", the first and second common electrodes 124 and 127 extend from the first and second common lines 118 and 121. One end of the first and second common electrodes 124 and 127 is connected to the first common line 118, and the other end of the first and second common electrodes 124 and 127 is connected to the second common line 121. The first and second common lines 118 and 121, and the first and second common electrodes 124 and 127 surround an edge of the pixel region "P". In the storage region "StgA", the second common line 121 functions as the first storage electrode 122.

The gate line 113, the first and second common lines 118 and 121, the first and second common electrodes 124 and 127, the gate pad electrode 129 (of FIG. 5), and the data pad electrode 130 may have a double-layered structure or a triple-layered structure. More particularly, the gate line 113, the first and second common lines 118 and 121, the first and second common electrodes 124 and 127, the gate pad electrode 129 (of FIG. 5), and the data pad electrode 130 include a first metal layer 113a, 118a, 121a, 124a, 127a and 130a, respectively, and a transparent conductive layer 113b, 118b, 121b, 124b, 127b and 130b on the corresponding first metal layer 113a, 118a, 121a, 124a, 127a and 130a. The first metal layer 113a, 118a, 121a, 124a, 127a and 130a is formed of a first metal that has low resistance properties, and the transparent conductive layer 113b, 118b, 121b, 124b, 127b and 130b is formed of a transparent conductive metal that has anti-rust properties. The first metal may include, for example, aluminum, aluminum alloy, copper, chrome and molybdenum. The transparent conductive metal may include, for example, indium-tin-oxide (ITO) and indium-zinc-oxide (IZO). Moreover, a second metal layer (not shown) may be formed of a second metal between the first metal layer 113a, 118a, 121a, 124a, 127a and 130a and the transparent conductive layer 113b, 118b, 121b, 124b, 127b and 130b such that the gate line 113, the first and second common lines 118 and 121, the first and second common electrodes 124 and 127, the gate pad electrode 129 (of FIG. 5), and the data pad electrode 130 have the triple-layered structure. When the first metal is aluminum or aluminum ally, the second metal may be molybdenum.

The gate insulating layer 135 is formed on the gate line 113, the first and second common lines 118 and 121, and the first and second common electrodes 124 and 127. The gate insulating layer 135 includes the common line contact hole 139, the data link line contact hole 171 (of FIG. 5), a gate pad contact hole 138 (of FIG. 5) and a data pad contact hole 137. The common line contact hole 139, which has a first and second common line contact holes 139a and 139b, exposes the first common line 118, and the data link line contact hole exposes the data link line 123 (of FIG. 5). The gate pad contact hole 138 (of FIG. 5) and the data pad contact hole 137 expose the gate pad electrode 129 (of FIG. 5) and the data pad electrode 130, respectively. In an exemplary embodiment of the present invention, the common line contact hole 139 has two common line contact holes, but the common line contact hole 139 may have one or more than two common line contact holes. The semiconductor layer 145 includes an active layer 141, a first ohmic contact layer 144a and a second ohmic contact layer 144b. The active layer 141 is made of an intrinsic amorphous silicon, and the first and second ohmic contact layers 144a and 144b are made of an impurity-doped amorphous silicon. The first and second ohmic contact layers 144a and 144b are disposed on the active layer 141 and separated from each other.

On the gate insulating layer 135 and the semiconductor layer 145, the data line 146, the source electrode 150 and the drain electrode 153 are formed. The data line 146 crosses the gate line 113 such that the pixel region "P" is defined on the substrate 110. The source electrode 150 extends from the data line 146 and is disposed on the first ohmic contact layer 144a. The drain electrode 153 is separated from the source electrode 150 and disposed on the second ohmic contact layer 144b. The drain electrode 153 extends into the storage area "StgA". The source electrode 150 covers one end of the first ohmic contact layer 144a and the active layer 141, and the drain electrode 153 covers an end of the second ohmic contact layer 144b and the other end of the active layer 141.

Though not shown, the data line 146 is connected to the data pad electrode 130 in the data pad region "DPA" through the data link line 123 (of FIG. 5), the data link line contact hole 171 (of FIG. 5) and the data pad contact hole 137. In FIG. 7, the second storage electrode 156 in the storage region "StgA" extends from the drain electrode 153 and overlaps the first storage electrode 122. The first storage electrode 122, the second storage electrode 156 and the gate insulating layer 135 compose the storage capacitor "StgC" in the storage region "StgA".

The pixel electrode 160 including the first and second pixel electrodes 160a and 160b is formed on the gate insulating layer 135. The pixel electrode 160 extends from the second storage electrode 156 into the pixel region "P" such that the pixel electrode 160 is electrically connected to the drain electrode 153. The first and second pixel electrodes 160a and 160b are separated from each other and substantially parallel to the first and second common electrodes 124 and 127, respectively. The third common electrode 165 is formed between the first and second pixel electrodes 160a and 160b and connected to the first common line 118 through the first and second contact holes 139a and 139b.

Since the above-mentioned array substrate for the IPS-mode LCD device is fabricated through three mask processes, a process time and a production cost decreases. Moreover, since the source and drain electrodes 150 and 153 cover both ends of the semiconductor layer 145, the array substrate does not have a problem of wavy noise.

FIGS. 10A to 10H are cross-sectional views showing processes of fabricating a portion taken along the line VI-VI of FIG. 5, FIGS. 11A to 11H are cross-sectional views showing processes of fabricating a portion taken along the line VII-VII of FIG. 5, FIGS. 12A to 12H are cross-sectional views showing processes of fabricating a portion taken along the line VIII-VIII of FIG. 5, and FIGS. 13A to 13H are cross-sectional views showing processes of fabricating a portion taken along the line IX-IX of FIG. 5.

FIGS. 10A, 11A, 12A and 13A describe a first mask process. As shown in FIGS. 10A, 11A, 12A and 13A, the first and second common electrodes 124 and 127, the gate line 113, the first and second common lines 118 and 121, and the data pad electrode 130 are formed on the substrate 110 by depositing and patterning the first metal and the transparent conductive metal through the first mask process. The first and second common electrodes 124 and 127, the gate line 113, and the first and second common lines 118 and 121 are formed along a side of the pixel region "P", and the data pad electrode 130 is formed in the data pad region "DPA". At the same time, the gate pad electrode 129 (of FIG. 5) is formed in the gate pad region "GPA", and the data link line 123 (of FIG. 5), which is connected to the data pad electrode 130 and the data line 146, is formed in the data pad region "DPA". The first and second common electrodes 124 and 127, the gate line 113, the first and second common lines 118 and 121, the data pad electrode 130, and the gate pad electrode 129 (of FIG. 5) have a double-layered structure. The first and second common electrodes 124 and 127 extend from the first and second common lines 118 and 121 into the pixel region "P", and the first and second common electrodes 124 and 127, and the first and second common lines 118 and 121 surround the pixel region "P". The gate line 113 is formed along a side of the pixel region "P" and functions as the gate electrode 115 in the switching region "TrA". The second common line 121 functions as the first storage electrode 122 in the storage region "StgA". The gate pad electrode 129 (of FIG. 5) is formed at the end of the gate line 113 in the gate pad region "GPA" (of FIG. 5), and the data pad electrode 130 is formed in the data pad region "DPA" with connected to the data line 146 (of FIG. 5).

In particular, the first common electrode 124 has a first metal layer 124a and the transparent conductive layer 124b, and the second common electrode 127 has a first metal layer 127a and a transparent conductive layer 127b. The gate line 113 has the first metal layer 113a and the transparent conductive layer 113b. The first common line 118 has the first metal layer 118a and the transparent conductive layer 118b, and the second common line 121 has the first metal layer 121a and the transparent conductive layer 121b. The data pad electrode 130 has the first metal layer 130a and the transparent conductive layer 130b, and the gate pad electrode 129 (of FIG. 5) also has the first metal layer (not shown) and the transparent conductive layer (not shown). As mentioned above, the first metal may include aluminum, aluminum alloy, copper, chrome and molybdenum, and the transparent conductive metal may include indium-tin-oxide (ITO) and indium-zinc-oxide (IZO). The first metal has the low resistance, and the transparent conductive metal has anti-rust properties. The second metal layer (not shown) may be further formed between the first metal layer 113a, 118a, 121a, 124a, 127a and 130a and the transparent conductive layer 113b, 118b, 121b, 124b, 127b and 130b such that the gate line 113, the first and second common lines 118 and 121, the data pad electrode 130, and the gate pad electrode 129 (of FIG. 5) have the triple-layered structure. The second metal layer (not shown) may be made of molybdenum.

As shown in FIGS. 10B, 11B, 12B and 13B, the gate insulating layer 135 is formed on the substrate 110 including the gate line 113, the first and second common lines 118 and 121, the data pad electrode 130, and the gate pad electrode 129 (of FIG. 5) by depositing an inorganic insulating material. The inorganic insulating material may be silicon oxide ($SiO_2$) or silicon nitride (SiNx). The intrinsic amorphous silicon layer 140 and the impurity-doped amorphous silicon layer 143 are formed on the gate insulating layer 135 by sequentially depositing the intrinsic amorphous silicon and the impurity-doped amorphous silicon. Then, a photoresist (PR) layer 181 is formed on the impurity-doped amorphous silicon layer 143 by depositing photoresist. In this exemplary embodiment, the photoresist is a positive type that a portion irradiated is removed. However, photoresist of a negative type may be used.

Figure 11A:
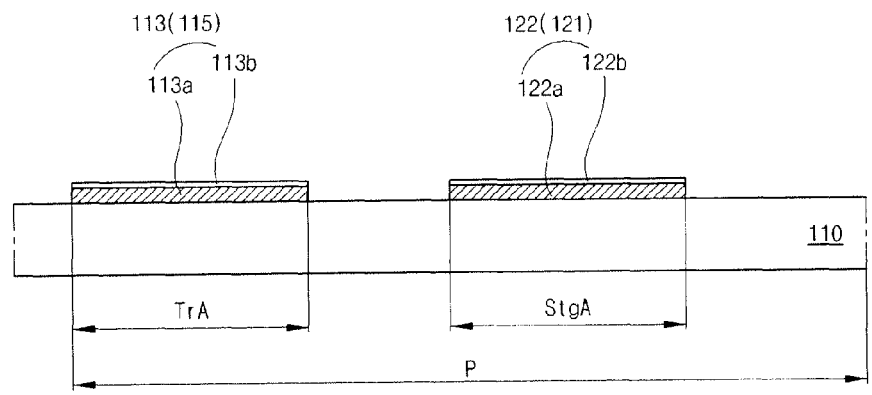
Figure 11B:
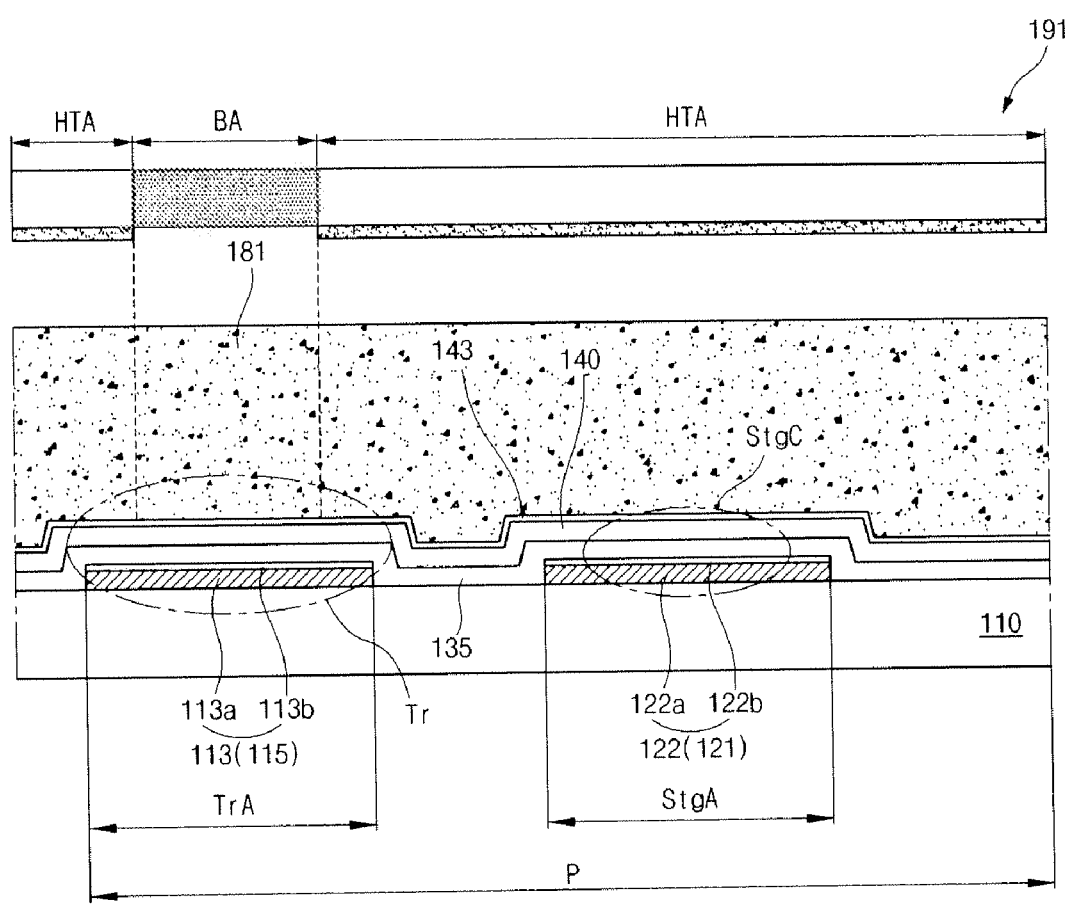
Figure 11C:
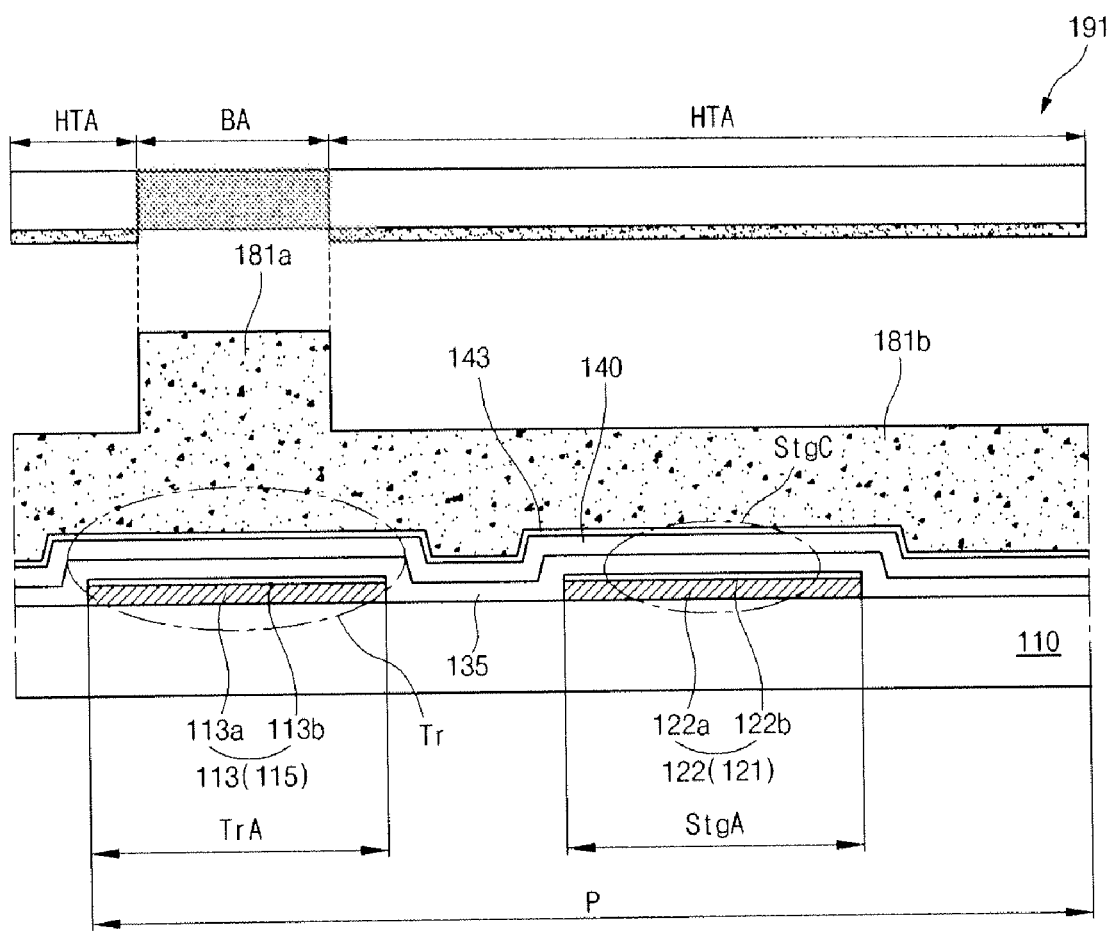
Figure 11D:
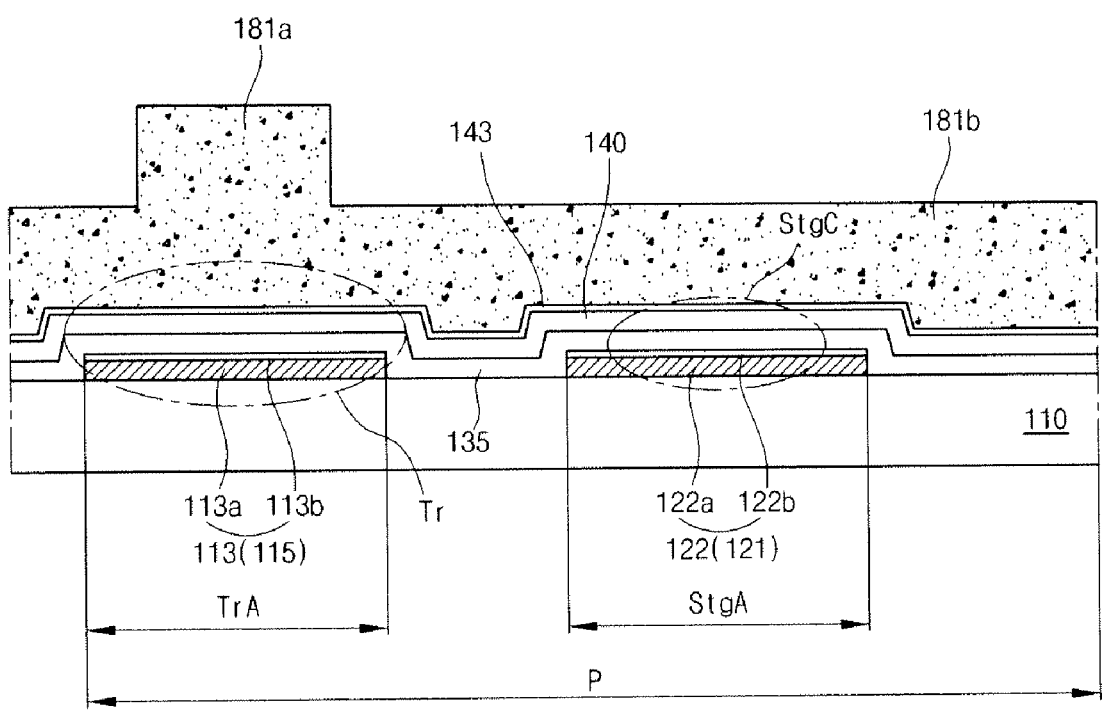
Figure 11E:
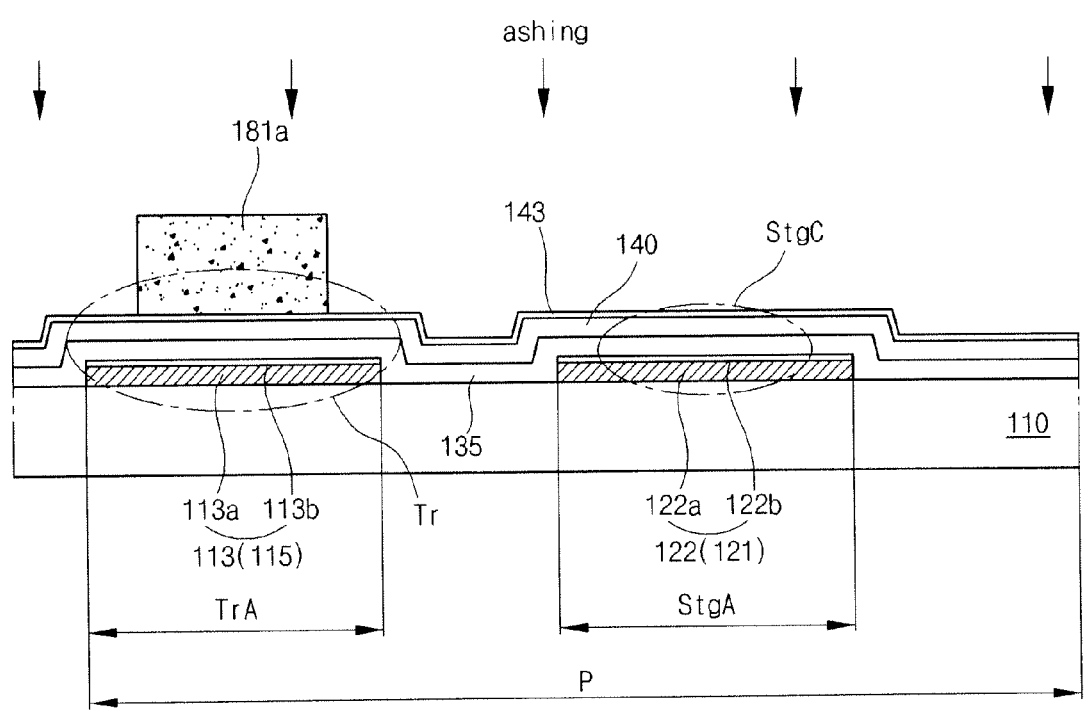
Figure 11F:
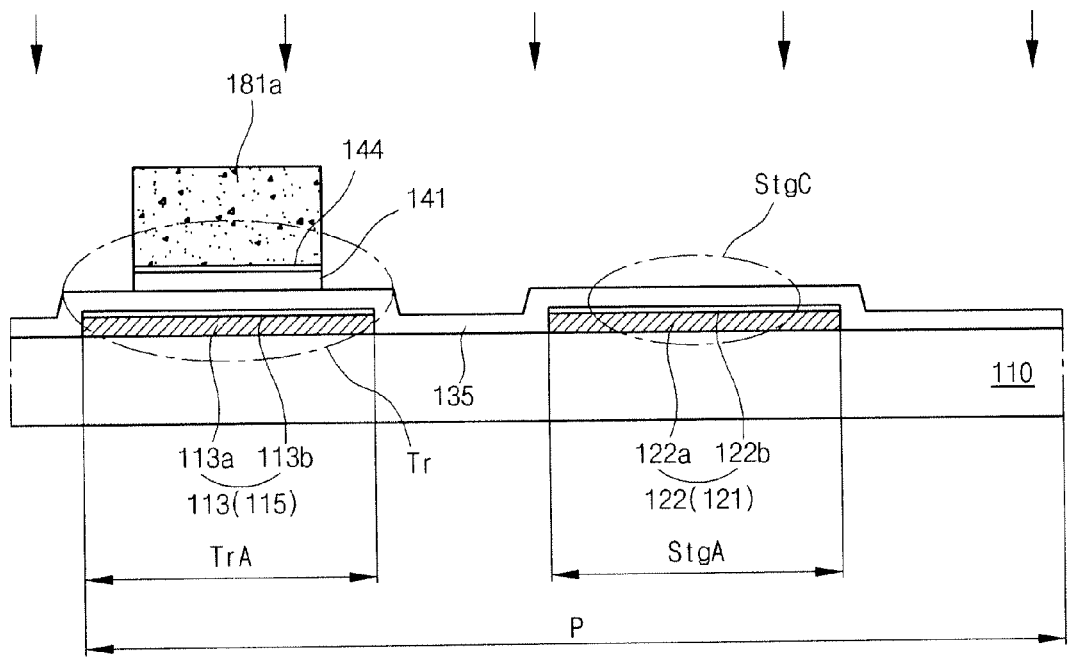
Figure 11G:
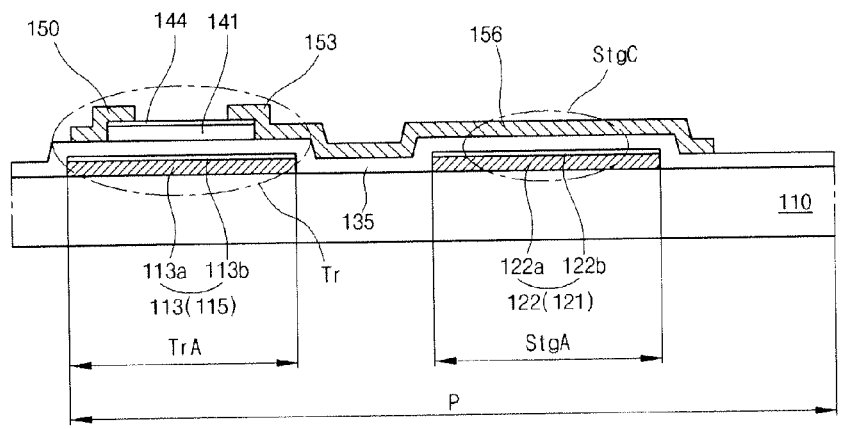
Figure 12B:
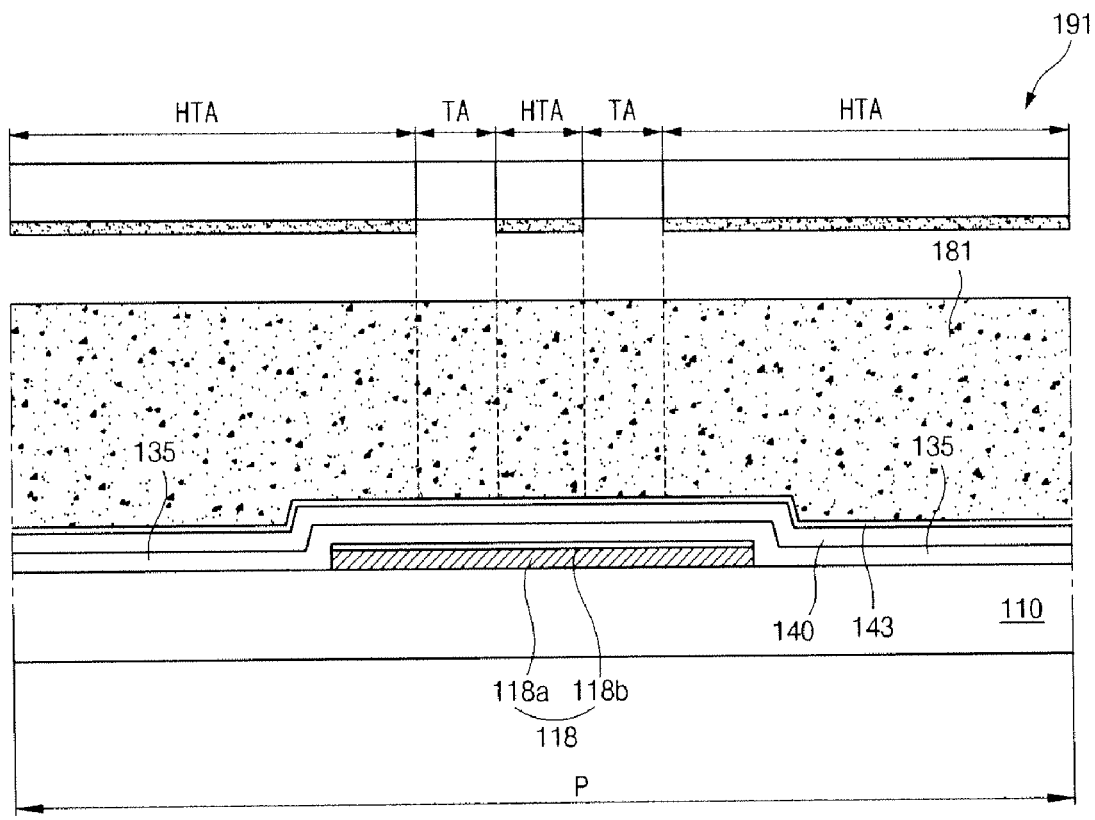
Figure 12C:
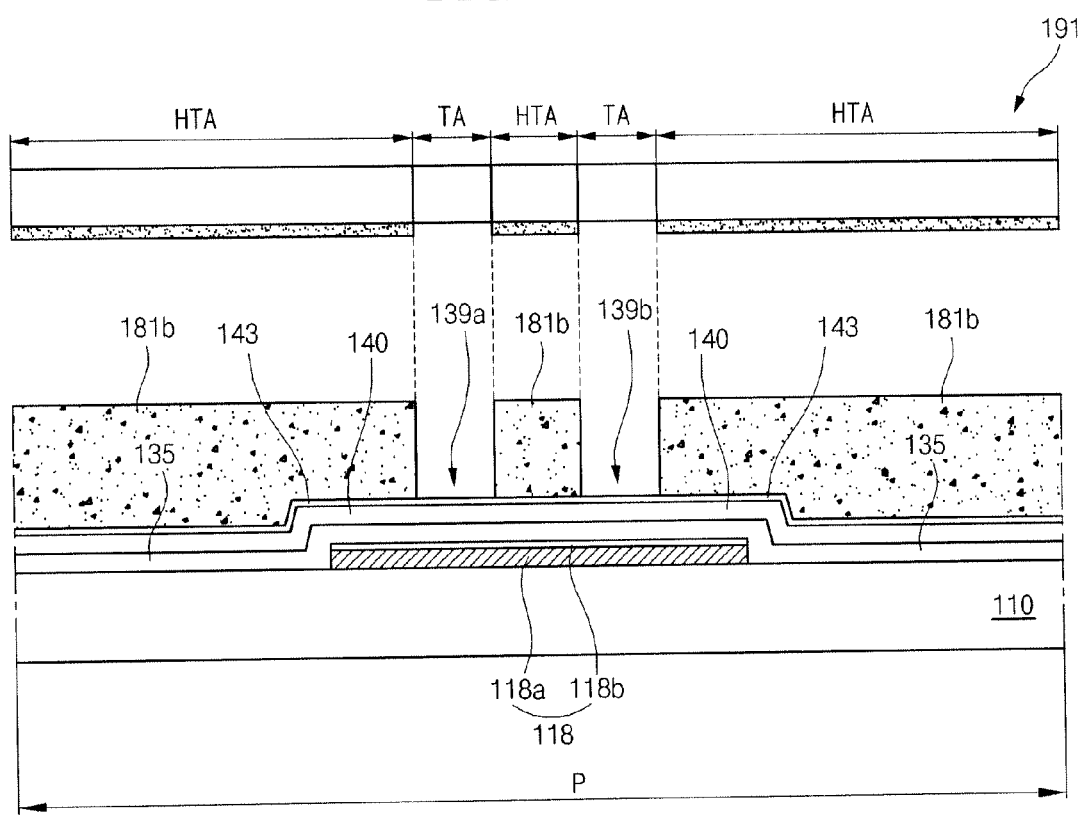
Figure 12D:
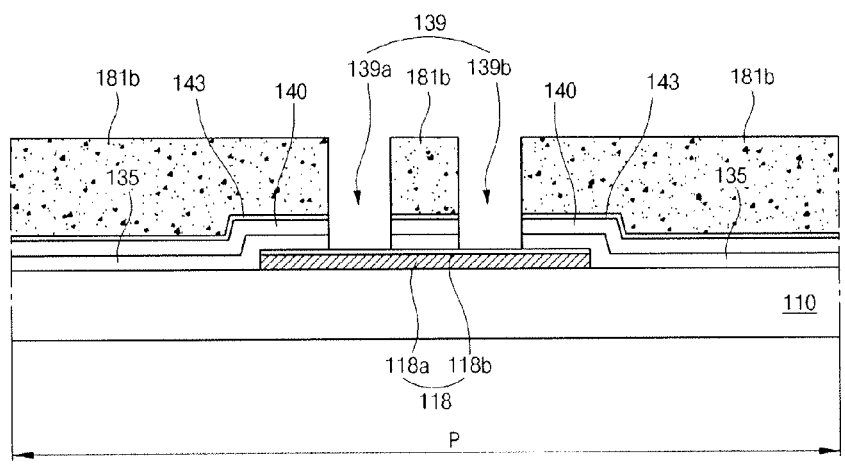
Figure 12E:
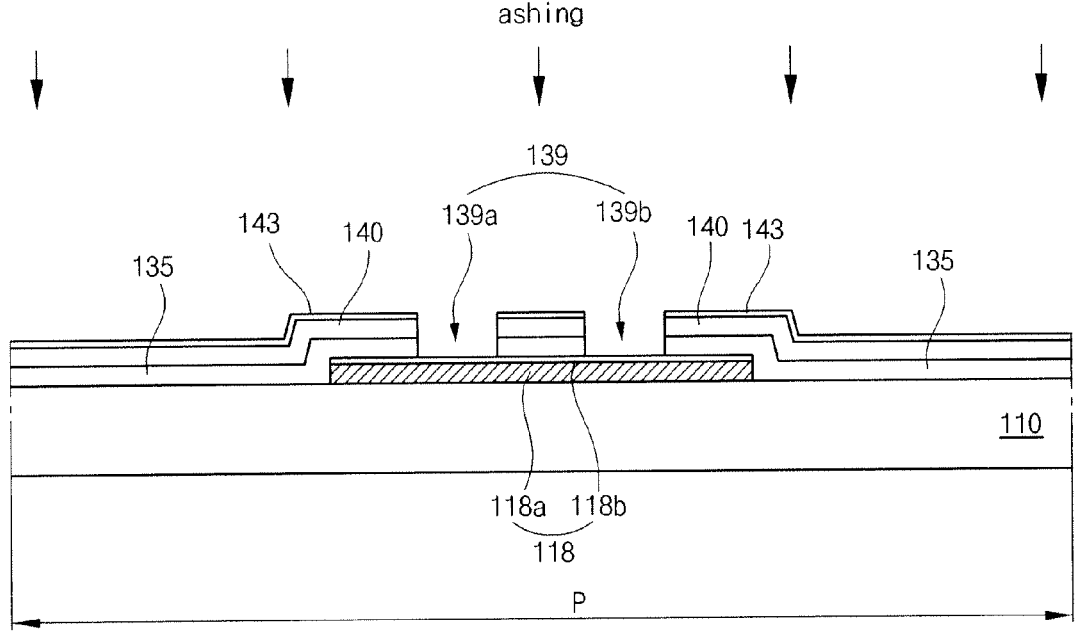
Figure 12F:
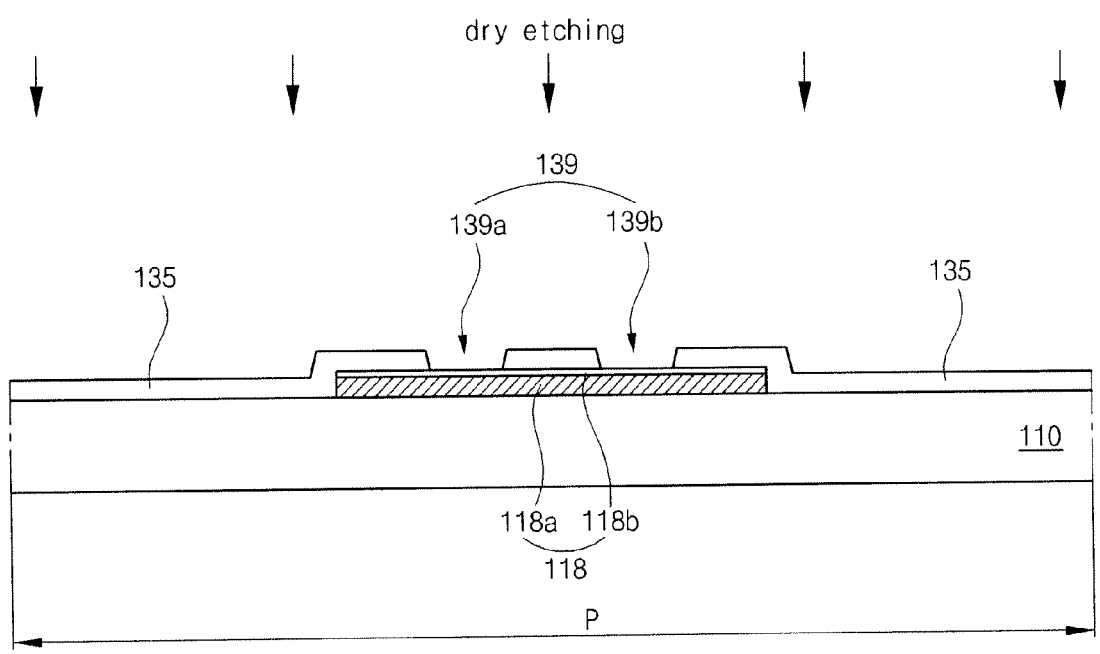
Figure 12G:
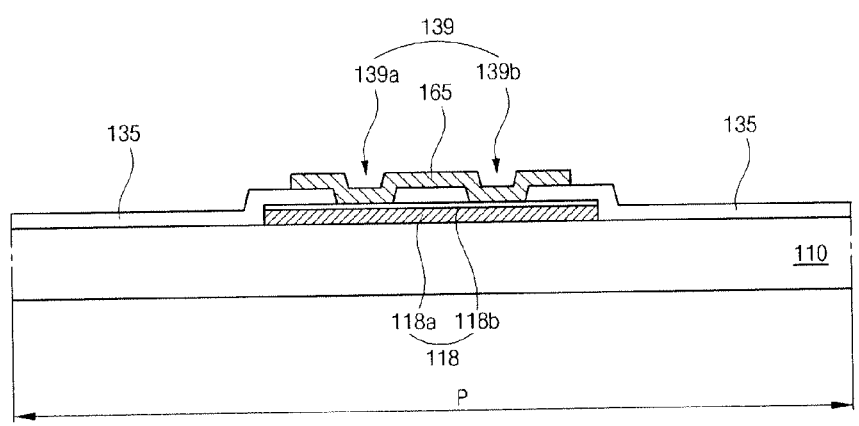
Figure 13A:
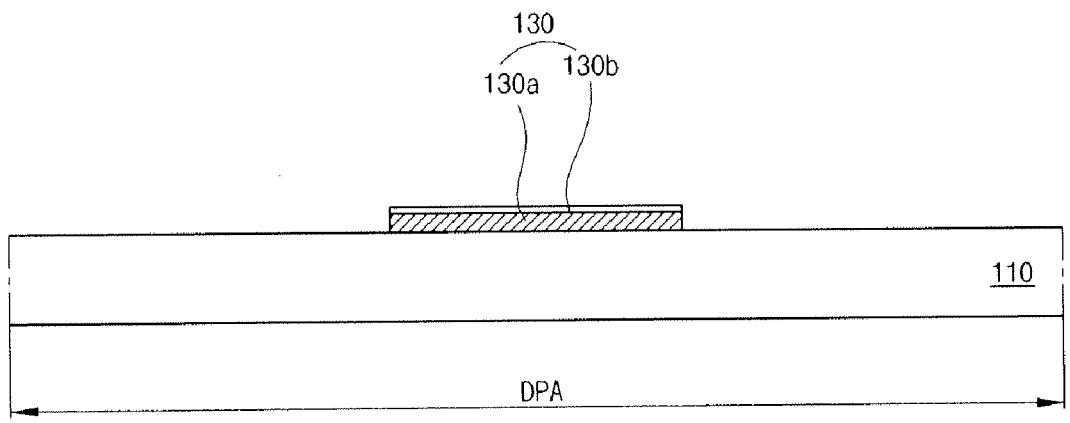
FIGS. 13A to 13H are cross-sectional views showing processes of fabricating a portion taken along the line IX-IX of FIG. 5.
Figure 13B:
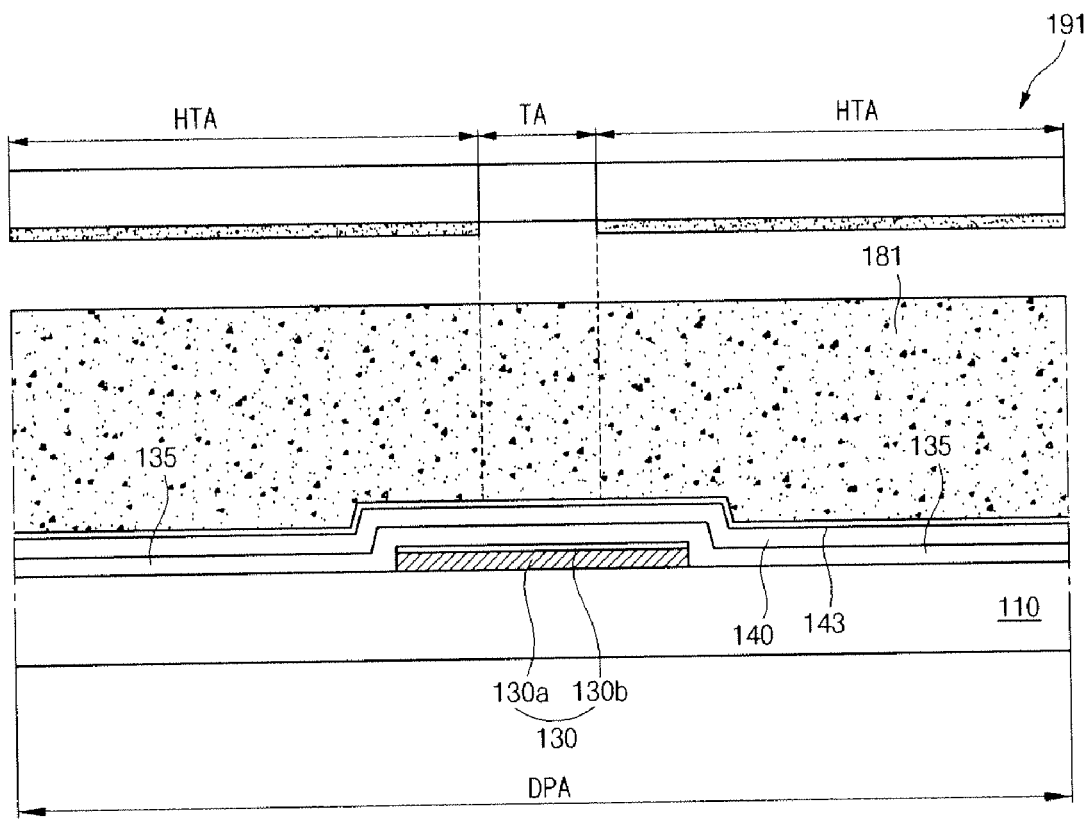
Figure 13C:
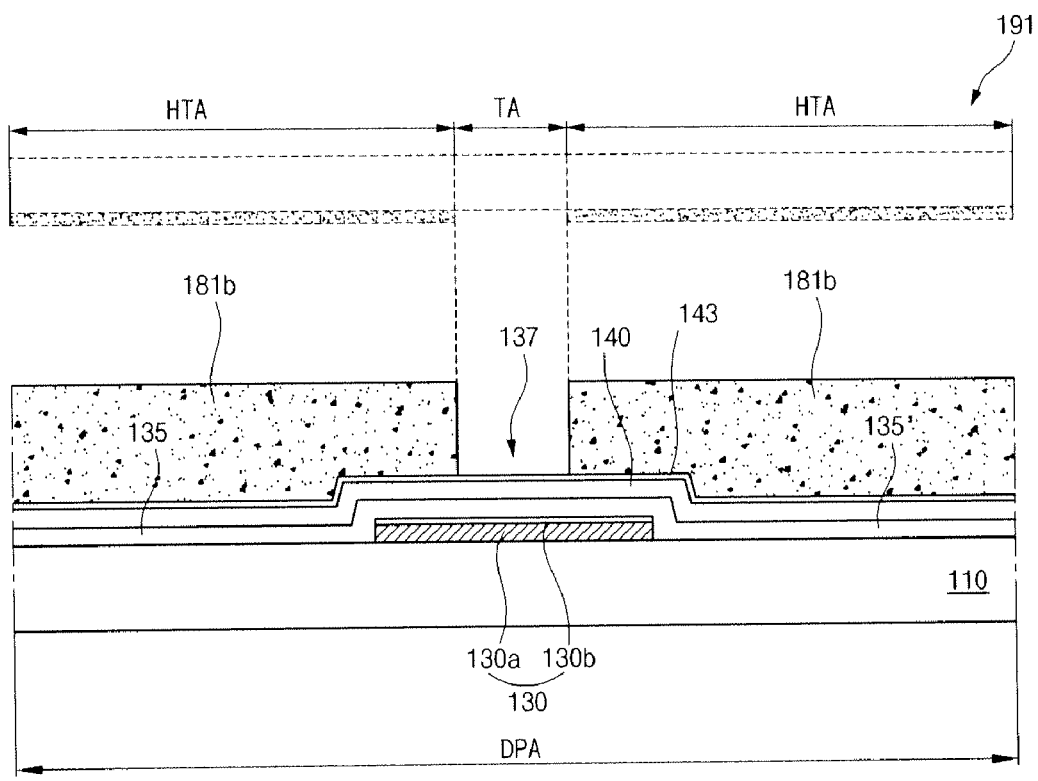
Figure 13D:
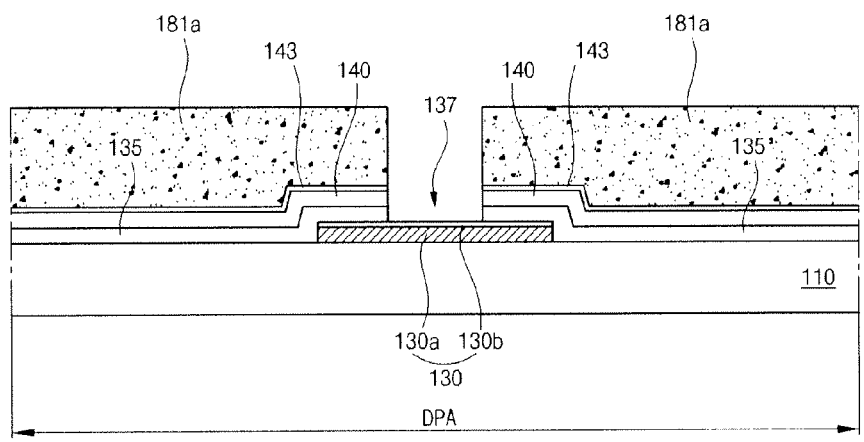
Figure 13E:
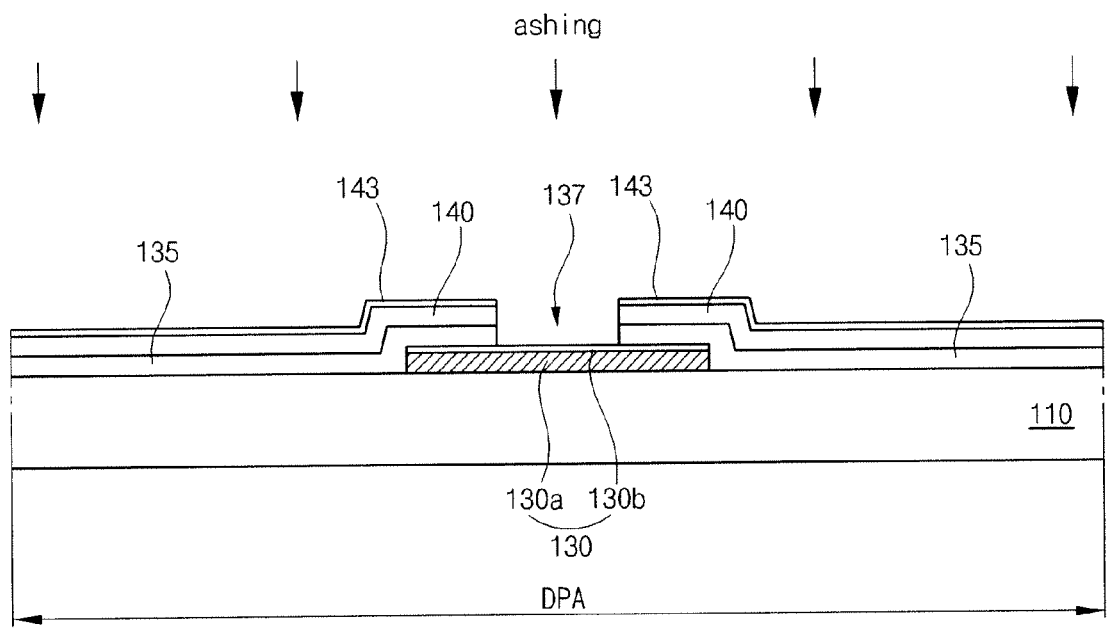
Figure 13F:
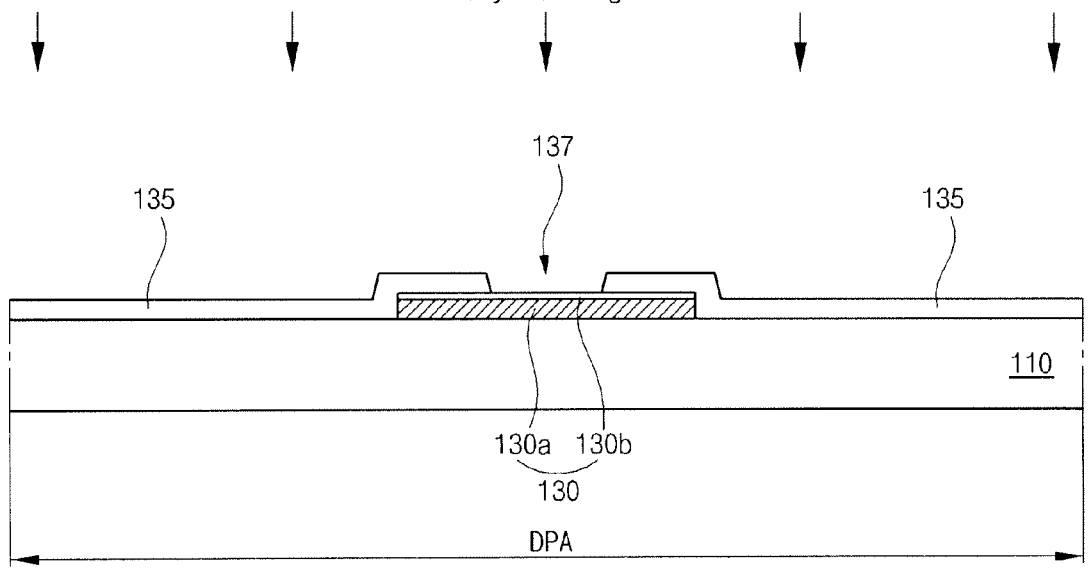
Figure 13G:
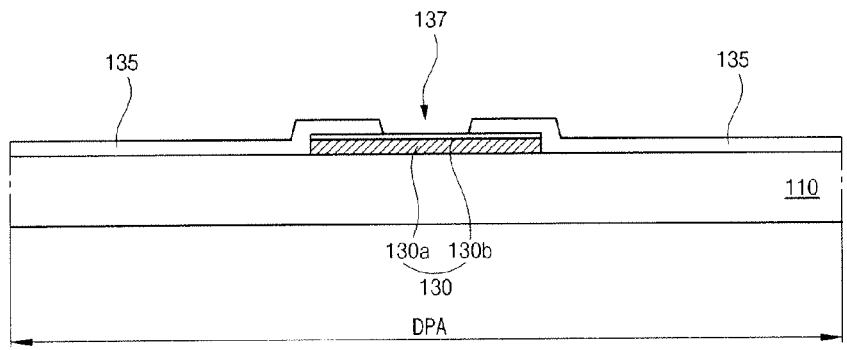
Figure 13H:
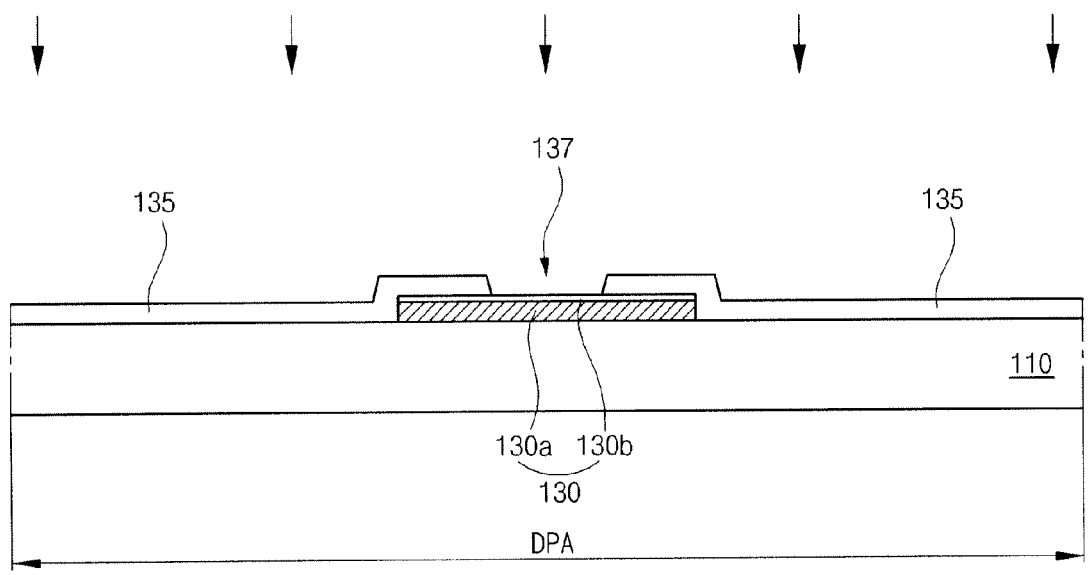

A mask 191 is disposed over the PR layer 181. As illustrated in FIGS. 11B and 12B, the mask 191 has a transmissive area "TA", a blocking area "BA", and a half-transmissive area "HTA". The half-transmissive area "HTA" has a transmittance that is smaller than that of the transmissive area "TA" and greater than that of the blocking area "BA". The transmissive area "TA" may have a transmittance of about 100 percentage, and the blocking area "BA" may have a transmittance of about 0 percentage. PR patterns having various heights can be obtained by using the above-mentioned mask. The transmissive area "TA" corresponds to a symmetric portion from the center of the first common line 118 shown in FIG. 12B and a center of the data pad electrode 130 in FIG. 13B. The first and second common line contact holes 139a and 139b (of FIG. 5) are formed in the symmetric portions, and the data pad contact hole 137 (of FIG. 5) is to be formed in the center of the data pad electrode 130. The blocking area "BA" corresponds to the switching area "TrA", and the half-transmissive area "HTA" corresponds to other portions. The semiconductor layer 145 is to be formed in a portion corresponding to the blocking area "BA". Though not shown, the transmissive area "TA" corresponds to a center of the gate pad electrode, in which the gate pad contact hole is to be formed.

As show in FIGS. 10C, 11C, 12C and 13C, a first PR pattern 181a and a second PR pattern 181b are formed on the impurity-doped amorphous silicon layer 143 by exposing and developing the PR layer 181 using the mask 191. The first PR pattern 181a corresponding to the blocking area "BA" has a first height, and the second PR pattern 181b corresponding to the half-transmissive area "HTA" has a second height smaller than the first height of the BA. The impurity-doped amorphous silicon layer 143 corresponding to the transmissive area "TA" is exposed between the second PR patterns 181b.

Next, as shown in FIGS. 10D, 11D, 12D and 13D, the first and second common line contact hole 139a and 139b in the first common line 118, the gate pad contact hole 138 (of FIG. 5) in the gate pad electrode 129 (of FIG. 5), and the data pad contact hole 137 in the data pad electrode 130 are formed by sequentially removing the impurity-doped amorphous silicon layer 143 exposed between the second PR patterns 181b, the intrinsic amorphous silicon layer 140 and the gate insulating layer 135. Though not shown, at the same time, the data link line contact hole 171 (of FIG. 5) is formed at an end of the data link line 123 (of FIG. 5). The first and second common line contact holes 139a and 139b expose the first common line 118, respectively, and the gate pad contact hole 138 (of FIG. 5) exposes the gate pad electrode 129 (of FIG. 5). The data pad contact hole 137 exposes the data pad electrode 130, and the data link line contact hole 171 (of FIG. 5) exposes the data link line 123 (of FIG. 5).

Since the gate pad electrode 129 (of FIG. 5), the data pad electrode 130, the first common line 118, and the data link line 123 (of FIG. 5) have an uppermost layer of the transparent conductive metal, there is no problem of rust. Moreover, since the first and second common line contact holes 139a and 139b are covered with the liquid crystal molecules, the problem of rust does not occur.

As shown in FIGS. 10E, 11E, 12E and 13E, the second PR pattern 181b (of FIGS. 10D, 11D, 12D and 13D) is removed by ashing the first and second PR patterns 181a and 181b, thereby exposing the impurity-doped amorphous silicon layer 143 below the second PR pattern 181b. The first PR pattern 181 in the switching region "TrA" has a smaller height than the first height.

As shown in FIGS. 10F, 11F, 12F and 13F, the impurity-doped amorphous silicon layer 143 exposed by ashing and the intrinsic amorphous silicon layer 140 are sequentially removed by dry etching such that the gate insulating layer 135, which corresponds to the intrinsic amorphous silicon layer 140 removed by dry etching, is exposed. Accordingly, the impurity-doped amorphous silicon layer 143 exposed by ashing and the intrinsic amorphous silicon layer 140 remain in the switching region "TrA", and thereby being the ohmic contact layer 144 and the active layer 141, respectively. Then, the first PR pattern 181a is removed from the ohmic contact layer 144.

As shown in FIGS. 10G, 11G, 12G and 13G, the data line 146 on the gate insulating layer 135, the source electrode 150 on the ohmic contact layer 144 and the drain electrode 153 on the ohmic contact layer 144 are formed by depositing and patterning a metal layer (not shown) through a third mask process. The metal layer (not shown) may be made of molybdenum. The data line 146 crosses the gate line 113 such that the pixel region "P" is defined. The data line 146 contacts the data link line 123 (of FIG. 5) through the link line contact hole 171 (of FIG. 5). The source electrode 150 extends from the data line 146 into the switching region "TrA", and the drain electrode 153 is separated from the source electrode 150 such that the ohmic contact layer 144 is exposed between the source and drain electrodes 150 and 153. The drain electrode 153 extends into the storage region "StgA" such that the drain electrode 153 overlaps the first storage electrode 122, thereby functioning as the second storage electrode 156. The first storage electrode 122, the second storage electrode 156 and the gate insulating layer 135 interposed between the first storage electrode 122 and the second storage electrode 156 compose the storage capacitor "StgC".

At the same time, the pixel electrode 160 including the first pixel electrode 160a and the second pixel electrode 160b is formed in the pixel region "P". The first and second pixel electrodes 160a and 160b extend from the second storage electrode 156 such that the first and second pixel electrodes 160a and 160b electrically contact the drain electrode 153. The first and second pixel electrodes 160a and 160b are substantially parallel to the first and second common electrodes 124 and 127, respectively. Furthermore, the third common electrode 165 is formed in the pixel region "P". The third common electrode 165 between the first and second pixel electrodes 160a and 160b contacts the first common line 118 through the first and second common line contact holes 139a and 139b and is substantially parallel to the first and second pixel electrodes 160a and 160b.

As shown in FIGS. 10H, 11H, 12H and 13H, the first ohmic contact layer 144a and second ohmic contact layer 144b are formed by removing the ohmic contact layer 144 (of FIG. 11G) exposed between the source and drain electrodes 150 and 153, and thereby exposing the active layer 141. Then, a silicon oxide layer (not shown) may be formed on the active layer 141 exposed between the first and second ohmic contact layers 144a and 144b by plasma process under an ambient of oxygen. The silicon oxide layer (not shown) protects the active layer 141. A step of forming the silicon oxide layer (not shown) is not essential for the array substrate.

In a method of fabricating the array substrate for the IPS-mode LCD device according to the present invention, the pixel electrode 160, the third common electrode 165 and the data line 146 are formed on a same layer as each other with a same material as each other. Since the source and drain electrodes 150 and 153 covers both ends of the semiconductor layer 145, respectively, the problem of wavy noise does not occur. Also, the data pad electrode 130 is formed on a same layer as the gate pad electrode 129 with a same material as the gate pad electrode 129. The first and second pixel electrodes 160a and 160b, and the first, second and third common electrodes 124, 127 and 165 have bending shapes, thereby forming multi-domains.

The above-mentioned array substrate does not include a passivation layer. However, since a first alignment layer (not shown) is formed on the pixel electrode 160, the data line 146 and the third common line 165, a problem that the pixel electrode 160, the data line 146 and the third common line 165 become rusty does not occur. Also, the first alignment layer covers the data pad electrode 130, the gate pad electrode 129, the data link line 123.

The array substrate is combined with the color filter substrate (not shown) including the color filter layer (not shown) and a second alignment layer (not shown). And the liquid crystal layer (not shown) is interposed between the array substrate and the color filter substrate.

Figure 14:
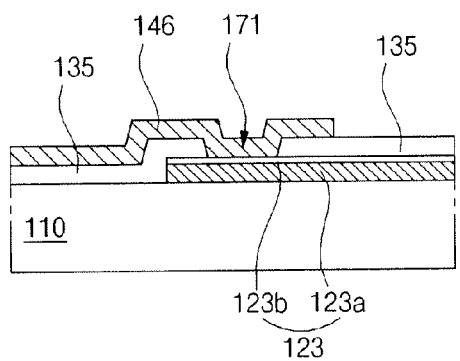
FIG. 14 is a cross sectional-view of a portion taken along the line XIV-XIV of FIG. 5.

FIG. 14 is a cross sectional-view of a portion taken along the line XIV-XIV of FIG. 5 and shows the data link line 123 and the data link line contact hole 171. As shown in FIG. 14, the data link line 123 includes the first metal layer 123a and the transparent conductive layer 124b is formed on the substrate 110. The data link line 123 contacts the data pad electrode 130 (of FIG. 5) through the data pad contact hole 137 (of FIG. 5). The gate insulating layer 135 is formed on the data link line 123. The gate insulating layer 135 has the data link line contact hole 171 exposing the data link line 123. The data line 146 is formed on the gate insulating layer 135 and contacts the data link line 123 through the data link line contact hole 171. In FIG. 14, the data link line 123 has a double-layered structure. Alternatively, the data link line may have a triple-layered structure as mentioned above.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for an IPS-mode LCD device, comprising:
    a substrate having a switching region and a pixel region;
    a gate line on the substrate;
    a gate electrode formed in the switching region and extending from the gate line;
    first and second common lines in one pixel region, each of the first and second common lines substantially parallel to the gate line and separated from the gate line;
    a common connection line being disposed outside of the pixel region and connecting the first and second common lines, the common connection line being positioned at the same layer as the first and second common lines and the gate line;
one common line pad electrode for applying a common voltage to the first and second common lines;
first and second common electrodes extending from each of the first and second common lines into the pixel region and separated from each other;
a gate insulating layer on the gate line, each of the first and second common lines and the first and second common electrodes, wherein the gate insulating layer has a common line contact hole exposing one of the first and second common lines;
a data line crossing the gate line to define the pixel region on the gate insulating layer;
a semiconductor layer corresponding to the gate electrode on the gate insulating layer;
a source electrode and a drain electrode separated from each other on the semiconductor layer, wherein the source electrode extends from the data line;
a plurality of pixel electrodes between the first and second common electrodes, wherein the plurality of pixel electrodes are separated from each other and substantially parallel to the first and second common electrodes, and each of the plurality of pixel electrodes extends from the drain electrode; and
a plurality of third common electrodes formed on the gate insulating layer, wherein the plurality of third common electrodes are connected to the one of the first and second common lines through the common line contact hole and alternately arranged with the plurality of pixel electrodes,
wherein the data line, the plurality of pixel electrodes and the plurality of third common electrodes are formed on a same layer and with a same material as one another, and the data line, the plurality of pixel electrodes and the plurality of third common electrodes are formed of an opaque metallic material.

2. The array substrate according to claim 1, wherein the first and second common electrodes are formed at opposite sides of the pixel region.

3. The array substrate according to claim 1, wherein each of the first and second common electrodes are connected to the first and second common lines and are adjacent to the data line.

4. The array substrate according to claim 1, wherein the common line contact hole exposes the first common line.

5. The array substrate according to claim 1, further comprising a storage capacitor including the second common line, a storage electrode extending from the drain electrode such that the storage electrode overlaps the second common line and the gate insulating layer interposed between the second common line and the storage electrode.

6. The array substrate according to claim 1, wherein the gate line is on a same layer as the first and second common electrodes with a same material as the first and second common electrodes.

7. The array substrate according to claim 1, wherein the gate line, the gate electrode, the first common electrode and the second common electrode have one of a double-layered structure and a triple-layered structure.

8. The array substrate according to claim 7, wherein an uppermost layer of the gate line, the gate electrode, the first common electrode and the second common electrode is a transparent conductive material.

9. The array substrate according to claim 1, further comprising a gate pad electrode and a data pad electrode, wherein the gate pad electrode is connected to the gate line and an external gate driving circuit, and the data pad electrode is connected to the data line and an external data driving circuit.

10. The array substrate according to claim 9, wherein the gate pad electrode and the data pad electrode are on a same layer and a same material as the gate line.

11. The array substrate according to claim 10, wherein the data pad electrode is connected to the data line through a data link line, wherein the data link line is on a same layer as the gate line and a same material as the gate line.

12. The array substrate according to claim 11, wherein the gate insulating layer includes a data link line contact hole exposing an end of the data link line, wherein the data line is connected to the data link line through the data link line contact hole.

13. The array substrate according to claim 10, wherein the gate insulating layer includes a gate pad contact hole exposing the gate pad electrode and a data pad contact hole exposing the data pad electrode.

14. The array substrate according to claim 1, wherein the source electrode and the drain electrode cover ends of the semiconductor layer.

15. The array substrate according to claim 1, further comprising a silicon oxide layer formed on the semiconductor layer between the source and drain electrodes.

16. The array substrate according to claim 1, wherein the semiconductor layer includes an active layer of intrinsic amorphous silicon and an ohmic contact layer of impurity-doped amorphous silicon layer on the active layer.

* * * * *